United States Patent
Ganju et al.

(10) Patent No.: US 12,206,748 B2
(45) Date of Patent: Jan. 21, 2025

(54) DATA CENTER JOB SCHEDULING USING MACHINE LEARNING

(71) Applicant: NVIDIA Corporation, Santa Clara, CA (US)

(72) Inventors: Siddha Ganju, Santa Clara, CA (US); Elad Mentovich, Tel Aviv (IL); Michael Balint, Nashville, TN (US); Eitan Zahavi, Zichron Yaakov (IL); Michael Sabotta, Cypress, TX (US); Michael Norman, Redwood City, CA (US); Ryan Wells, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/958,139

(22) Filed: Sep. 30, 2022

(65) Prior Publication Data
US 2024/0129380 A1 Apr. 18, 2024

(51) Int. Cl.
*G06F 11/30* (2006.01)
*H04L 41/16* (2022.01)
*H04L 67/60* (2022.01)

(52) U.S. Cl.
CPC .......... *H04L 67/60* (2022.05); *G06F 11/3062* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 7,447,920 B2 * | 11/2008 | Sharma | .............. | H05K 7/20836 709/224 |
| 7,644,051 B1 * | 1/2010 | Moore | .................. | G05B 13/048 706/903 |
| 8,489,745 B2 * | 7/2013 | Mandagere | ........... | G06F 1/3203 709/226 |
| 8,788,439 B2 * | 7/2014 | Martinez | ............. | H04L 67/1097 706/12 |
| 9,069,103 B2 * | 6/2015 | Williams | ................. | G01W 1/00 |
| 9,348,394 B2 * | 5/2016 | Harper, III | ............ | G06F 1/3206 |
| 10,216,606 B1 * | 2/2019 | Magcale | .............. | G06F 11/3409 |
| 10,234,833 B2 * | 3/2019 | Ahuja | ...................... | G06F 1/206 |
| 10,243,879 B2 * | 3/2019 | Wise | ..................... | G06F 9/5027 |
| 10,474,497 B1 * | 11/2019 | Kancharla | ............... | G06F 9/546 |
| 10,643,121 B2 * | 5/2020 | Evans | .................... | G06N 3/045 |

(Continued)

FOREIGN PATENT DOCUMENTS

CN 114970358 * 8/2022 ............. G06F 30/27

*Primary Examiner* — Backhean Tiv
(74) *Attorney, Agent, or Firm* — Lowenstein Sandler LLP

(57) ABSTRACT

A method includes receiving, using a processing device, a first condition associated with an operation at a data center, where the operation at the data center pertains to a first location at the data center, the first location corresponding to a first parameter value. The method further includes providing the first condition as an input to a machine learning model. The method also includes performing one or more reinforcement learning techniques using the machine learning model to cause the machine learning model to output an indication of a final location associated with the operation, where the final location corresponds to a final parameter value that is closer to a target than the first parameter value corresponding to the first location at the data center.

20 Claims, 15 Drawing Sheets

(56) References Cited

U.S. PATENT DOCUMENTS

| | | | |
|---|---|---|---|
| 10,791,168 B1* | 9/2020 | Dilley | H04L 67/288 |
| 10,841,236 B1* | 11/2020 | Jin | H04L 67/1014 |
| 10,956,230 B2* | 3/2021 | Gopalan | G06F 9/5088 |
| 11,269,395 B2* | 3/2022 | Bernat | G06F 1/3234 |
| 11,340,951 B2* | 5/2022 | Goodwin | G06F 8/71 |
| 11,424,993 B1* | 8/2022 | Chaoji | H04L 41/5009 |
| 11,461,210 B2* | 10/2022 | Tiwari | G06F 11/3442 |
| 11,609,784 B2* | 3/2023 | Metsch | G06N 20/00 |
| 11,644,882 B2* | 5/2023 | Kuno | G06F 1/305 |
| | | | 713/300 |
| 11,875,191 B1* | 1/2024 | Plenderleith | G06F 9/5094 |
| 2005/0228618 A1* | 10/2005 | Patel | G06F 9/505 |
| | | | 702/188 |
| 2014/0180978 A1* | 6/2014 | Martinez | H04L 63/302 |
| | | | 706/12 |
| 2016/0087909 A1* | 3/2016 | Chatterjee | G06F 9/5083 |
| | | | 709/226 |
| 2020/0037473 A1* | 1/2020 | Kommula | H05K 7/1498 |
| 2020/0133702 A1* | 4/2020 | Sharma | G06F 9/5088 |
| 2022/0012611 A1* | 1/2022 | Moradi | G06N 20/20 |
| 2023/0017632 A1* | 1/2023 | Herb | G06F 9/505 |

\* cited by examiner

DATA CENTER JOB SCHEDULING USING MACHINE LEARNING

TECHNICAL FIELD

At least one embodiment pertains to a use of machine learning to perform and facilitate job scheduling in a data center. For example, at least one embodiment pertains to technology for data center job scheduling utilizing reinforcement learning, according to various novel techniques described herein.

BACKGROUND

Data centers can store and process data for various purposes. Typically, the data center will include multiple nodes, each node having multiple graphics processing units (GPUs). When the data center receives a job (e.g., operation), the data center will utilize a job scheduler to select a location within the data center for the job. For example, the job scheduler will look for available nodes or GPUs and select a location accordingly—e.g., the job scheduler will look for three (3) available GPUs if a job received at the data center indicates three (3) GPUs are required. Some conventional solutions consider topology information when selecting the location. However, conventional solutions fail to consider thermal conditions or energy conditions when selecting the location in the data center for the job. Accordingly, temperature at various locations in the data center can be high and require long cooling times or the data center can consume additional power.

BRIEF DESCRIPTION OF DRAWINGS

Various embodiments in accordance with the present disclosure will be described with reference to the drawings, in which.

DETAILED DESCRIPTION

Figure 1A:
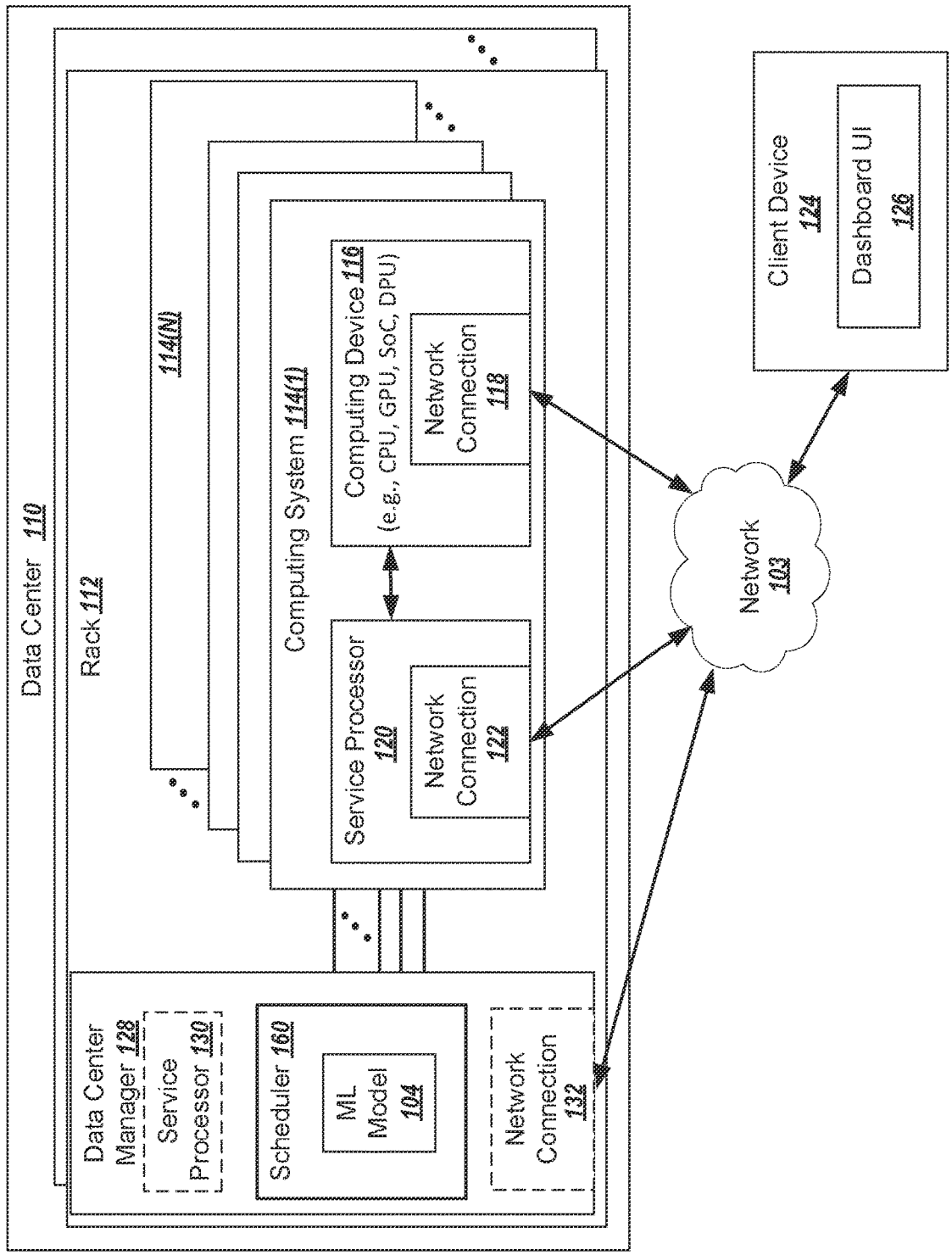
FIGS. 1A and 1B are example system utilizing machine learning in job scheduling, in accordance with at least some embodiments.

Data centers can store and process data for various purposes. For example, data centers can be used for networks that facilitate object (e.g., pedestrian) detection for an automotive where the automotive is trained based on a large input data set from training data stored at the data center. In other examples, the data center can store output data from medical instruments which can later be used for machine learning inferences. In these and other examples, the data center can process and store large amounts of data using multiple nodes, each node including multiple processing units (e.g., GPUs) to store and process data. Typically, the data center can utilize a job scheduler to select locations within the data center when the data center receives a job request. For example, the data center can receive a job request that takes four (4) graphics processing units (GPUs) to execute. The data center can use the job scheduler to select or find four available GPUs within the data center to execute the job request. The job scheduler can place job requests in a queue if there are not enough resources to execute the respective job request.

In conventional solutions, the job scheduler is primarily looking for available nodes and does not consider other factors. For example, the job scheduler can select the first available node, irrespective of other jobs or operations being executed in the data center. In data centers, the temperature can be maintained for each GPU, each node, and for the data center as a whole. Typically, the data center can cool a data center rack (e.g., a structure housing multiple nodes, servers, cables, networking devices, and other data center computing equipment) uniformly. Accordingly, the data center or node temperature is dependent on a job request that is generating the most heat. The job request that generates a maximum amount of heat can also dictate a cooling rate at a data center rack. If the job scheduler allocates a respective job request to the same data center rack, the temperature can increase and take longer to cool off—e.g., the data center rack can be unavailable for additional job requests for a longer duration as the cooling period takes longer. Similarly, if the job scheduler allocates the respective job request to nodes that are adjacent to other nodes already executing a job request, the temperature can increase for both nodes and take longer to cool off Allocating based on just the availability can also negatively impact water cooling, heat dissipation, air flow, a thermal equilibrium of a node, electricity costs, etc. Therefore the data center can perform inefficiently and increase costs.

Advantageously, aspects of the present disclosure can address the deficiencies above and other challenges by scheduling jobs in a data center using reinforcement learning with a machine learning model. For example, a processing device (e.g., job scheduler or executing agent) can provide a machine learning model with a condition (e.g., a thermal condition) and a job request. The processing device can receive or determine the condition based on user input or other requirements of the data center. The processing device can receive a condition representing a thermal or energy constraint or target for the data center—e.g., the processing device can receive a condition that indicates to reduce a temperature of the data center as a whole as much as possible when executing a respective job request. The processing device can receive a condition that represents at least one of a cooling condition for a node or GPU of the data center, a total energy consumption of the data center, water cooling conditions, heat dissipation conditions, air flow conditions, temperature conditions, location (e.g., location of adjacent operations, or location of all operations currently being executed at the data center) conditions, thermal equilibrium conditions, electricity consumption conditions, electricity costs conditions, a time (e.g., time of day or a duration associated with performing the job request) condition, etc. The processing device can also receive information regarding the location of other operations being executed across the data center. The machine learning model can determine (e.g., predict) a location within the data center that satisfies (or is the closest to satisfying) a target parameter associated with the condition. For example, the machine learning model can determine a location within the data center that will reduce energy consumption or energy costs the most. In other examples, the machine learning model can determine a location within the data center that will cause the least temperature increase or least cooling time. In that, the job scheduler can use the machine learning model to select locations for a job request that reduces a carbon footprint of the data center—e.g., the job scheduler can factor in conditions other than availability when selecting the location for the job request.

The processing device can generate a reward (e.g., parameter) that indicates a net change in a respective condition for a respective job—e.g., the processing device can generate a reward that indicates a net difference in temperature from executing the job request at a location rather than a second location. The reward can be used to update a training of the machine learning model—e.g., the machine learning model can undergo reinforcement learning based on the received reward. For example, the machine learning model can receive the reward, determine the selected location decreases energy consumption, and the processing device can update the machine learning model accordingly. The updated machine learning model can then predict a different location to execute the job request at, receive a second reward, update accordingly, and so forth. This process can be repeated, and the reinforcement learning of the location selection using the machine learning model can continue until a determination is made that no further improvements are being output (e.g., there are no other locations that will be closer to the target than a previous location predicted by the machine learning model)—e.g., until the job scheduler is optimized to select a location given the condition and job request. Additionally, the processing device can select the location based on the output of the machine learning model, determine an actual parameter (e.g., reward), and update the machine learning model if the actual results differ from the machine learning model prediction.

As the data center can receive any number of job requests, each having a different condition, the job scheduler can select one or more reinforcement learning techniques for each unique condition received—e.g., the job scheduler can select a first reinforcement learning technique for optimizing thermal conditions and a second reinforcement learning for a optimizing energy consumption. Accordingly, the data center can be optimized for any number of conditions as requested by a user. For example, the job scheduler can receive a condition associated with a predetermined water temperature, where the water can be used for other tasks such as melting snow on roads leading to the data center. In such examples, the processing device can select one or more reinforcement learning models associated with selecting a node in the data center that satisfies the predetermined water temperature.

By scheduling jobs using reinforcement learning (e.g., machine learning), the data center can conform to any number of conditions provided by a user—e.g., the job scheduler is not limited to selecting a location based on just availability. Additionally, the data center can perform better when temperature and energy consumption are considered and optimized for while selecting locations for jobs. For example, the job scheduler can avoid selecting adjacent nodes for job requests to reduce temperature and cooling times, allowing the data center to process more job requests faster.

FIG. 1A is a block diagram of a system 100 implementing machine learning in job scheduling, according to at least one embodiment. The system 100 can include a data center 110 coupled to a network 103. In some embodiments, the system 100 can include a client device 124 coupled with the network 103.

The data center 110 can include a rack 112 of one or more computing systems 114(1)-114(N), where N is a positive integer equal to or greater than zero. Each computing system 114 can include a computing device 116 and a service processor 120. In at least one embodiment, the computing device 116 can be considered a node. In other embodiments, multiple computing devices 116 can be considered a node—e.g., a node can include one or more computing devices 116. In some embodiments, the computing device 116 can be an example of a graphics processing unit (GPU) or central processing unit (CPU). Although one computing device 116 is shown for each computing system 116, it should be noted each computing system 114 can include any number of computing devices 116 greater than one (1). In at least one embodiment, the service processor 120 is a baseboard management controller (BMC). The BMC can be part of an IPMI type interface and can be located on a circuit board (e.g., motherboard) of the computing device 116 being monitored. The BMC can include one or more sensors that are operatively coupled to the computing device 116 or integrated within the computing device 116. The sensors of a BMC measure internal physical variables such as temperature, humidity, power-supply voltage, fan speeds, communications parameters, and operating system (OS) functions. The BMC can provide a way to manage a computer that may be powered off or otherwise unresponsive. The service processor 120 provides out-of-band functionality by collecting the power consumption data of the computing device 116 independently from the computing device's CPU, firmware, and OS. The service processor 120 can provide the power consumption data via a network connection 122 independent from a primary network connection 118 of the computing device 116. The service processor 120 can use the network connection 122 to the hardware itself rather than the OS or login shell to manage the computing device 116, even if the computing device 116 is powered off or otherwise unresponsive. Although one rack 112 is illustrated, the data center 110 can include any number of racks 112 equal or greater than one (1).

In at least one embodiment, the rack 112 can be coupled with or include a data center manager 128—e.g., the data center manager 128 can be coupled with multiple racks 112 or each rack 112 can include a data center manager 128. In some embodiments, the data center manager 128 can manage computing device 116 of the rack 112 and computing systems 114. In some embodiments, the data center manager 128 can include a service processor 130 and be connected to the network via network connection 132. In at least one embodiment, the data center manager 128 includes a scheduler 160 with a machine learning (ML) model 104—e.g., the data center manager 128 includes a ML supported scheduler 160.

Figure 1B:
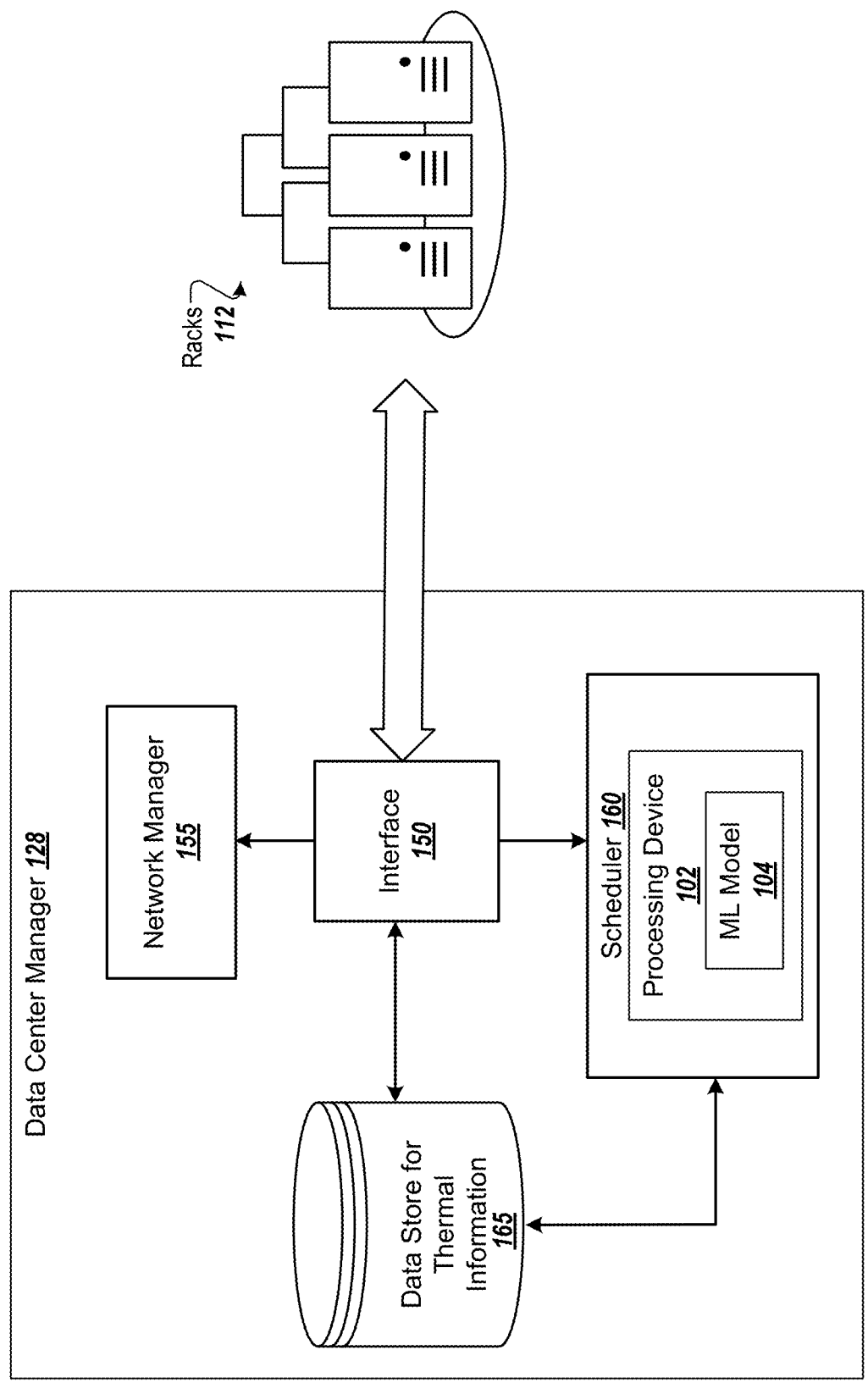

FIG. 1B is a block diagram of a data center manager 128 in a data center 110 implementing machine learning to schedule operations or jobs, according to at least one embodiment. The data center manager 128 can include an interface 150, a network manager 155, a scheduler 160, and a data store 165. In at least one embodiment, the data center manager 128 is configured to manage the racks 112—e.g., schedule operations. In some embodiments, the data center manager 128 can detect and respond to events occurring at the racks 112—e.g., starting a new cluster for an incoming operation or detecting a current cluster or rack 112 is failing.

In at least one embodiment, the interface 150 can enable the data center manager 128 to communicate commands, operations, information, etc., to the racks 112. For example the interface 150 can enable the data center manager 128 to schedule operations at the racks 112. In at least one embodiment, the data center manager 128 can monitor and detect when nodes (e.g., computing devices 116) are down or creates clusters or pods to execute incoming operations. In some embodiments, the interface 150 is an example of an application programming interface (API) server. The interface can manage the network manager 155, the scheduler 160, and the data store 165.

In at least one embodiment, network manager 155 can link the data center manager 128 and the racks 112 to a cloud network or cloud environment. For example, the network manager 155 can link a cluster to a cloud provider API. In some embodiments, the network manager 155 can check nodes in the cloud network, set up routes in the cloud network, or create, update, and delete cloud network load balancers.

In some embodiments, scheduler 160 is configured to schedule operations at nodes or computing device 116 of the racks 112. In at least one embodiment, the scheduler 160 includes code, a component, or a configurable plug-in that indicates how to allocate resources—e.g., indicates a basis for selecting nodes for performing a job. In some embodiments, the scheduler 160 includes a processing device 102 that executes a machine learning (ML) model 104 trained to schedule jobs according to thermal conditions provided. For example, the processing device 102 can execute an ML model 104 to schedule operations in a manner that reduces energy consumption, reduces a temperature of a respective node, rack 112, or the data center 110 or increases cooling efficiency. That is, the ML model 104 can schedule operations that optimize the thermal conditions of the data center 110. For example, the scheduler 160 can receive an operation that will execute at three (3) nodes of the data center 110. The ML model 104 can be trained to select three (3) available nodes that will execute the operation with the least amount of energy consumption or cause the least amount of temperature increase in the data center 110. In some embodiments, the ML model 104 can be trained to optimize for at least one of the following thermal conditions; water cooling, heat dissipation, or air flow direction—e.g., where airflow direction describes whether a respective compute nodes are using air that is recirculated datacenter air or filtered air from outside the datacenter. Additional thermal conditions and constraints are discussed with reference to FIGS. 2-4. In at least one embodiment, the ML model 104 can be trained by a set of training data that includes at least one of a water cooling parameter, heat dissipation parameter, air flow direction parameter, a type of operation to execute, an amount of nodes corresponding to executing the operation, and an amount of energy consumed. That is, the ML model 104 can be trained by mapping between the parameters and the thermal conditions and energy consumed or cooling provided. In one embodiment, the processing device 102 can calculate floating point operations per second (e.g., FLOPS) to measure computer performance using the parameters—e.g., the processing device 102 can calculate performance of the nodes given respective parameter values (e.g., given the node is operating with a first water cooling parameter (e.g., the node is cooling water at a respective rate). The ML model 104 can be trained to determine the energy consumed or cooling provided (e.g., for the node or for the data center) for the respective parameter—e.g., the energy consumed if the node is operating with the first water cooling parameter. In at least one embodiment, the processing device 102 can receive information regarding historical performance of a respective node—e.g., information regarding how much energy is consumed or a carbon footprint of utilizing the node. In at least one embodiment, the processing device 102 can receive information regarding historical performance of a respective GPU in a node. Additional details regarding the training is described with reference to FIGS. 2-4. It should be noted that the ML model 104 can utilize any machine learning model—e.g., a deep (sequential) network, a single level of linear or non-linear operations, reinforcement learning, etc. For convenience, the remainder of the disclosure will refer to the implementation as a reinforcement learning model, even though some implementations might employ other types of learning machine models instead of, or in addition to, a reinforcement learning model. In some embodiments, the reinforcement learning model or algorithm can include a deep Q-network (DQN), a deep deterministic policy gradient (DDPG), Markov decision process (MDP), etc. In at least one embodiment, the ML model 104 is trained in a simulated environment as described with reference to FIG. 2.

In at least one embodiment, ML model 104 can be trained to enable the scheduler 160 to make energy aware decisions. In at least one embodiment, the ML model 104 can be trained to use an outside air temperature (e.g., a temperature parameter) to schedule operations. For example, if the outside air temperature is less than 35 degrees Celsius (35° C.), that air could be filtered and directed to the compute nodes for cooling. In at least one embodiment, the node is configured to emit exhaust that is directed to outside the data center 110. In such embodiments, the data center 110 consumes energy (e.g., there is an energy charge) to filter and blow the air from outside to a front of the racks 112. In at least one embodiment, the data center 110 also consumes energy at the compute node based on the inlet air temperature provided. For example, as the input air temperature increases, racks 112 and nodes can consume additional energy due to increased fan power and additional leakage of the silicon at elevated temperatures. In at least one embodiment, the data center 110 can compare the energy consumed for filtering outside air with energy consumed to create 20 degrees Celsius (20° C.) Air with a traditional data center CRAH(Computer Room Air Handler) and compressor unit. For example, the data center 110 can consume additional power at a potentially lower temperature. Accordingly, the ML model 104 can be trained to select a node for an operation based on a performance of a respective node filtering outside air or using the CRAH.

In at least one embodiment, the ML model 104 can be trained to enable the scheduler 160 to select nodes for an operation to create or warm water temperatures. For example, the scheduler 160 can schedule more operations at a rack 112 if there is request or indication to have warm water for district heating applications. In at least one embodiment, water control is typically at a rack 112 or at a CDU (Coolant Distribution Unit) level. In at least one embodiment, it is difficult to isolate water flow at a compute node level. In some embodiments, the data center can generate higher output water temperature if all nodes in a rack 112 are active. Accordingly, if a scheduler 160 can optimize warm water for energy reuse, the scheduler 160 can schedule operations at one rack 112 to increase a number of active node at the rack 112 or CDU domain.

In at least one embodiment, the processing device 102 can train the ML model 104 using data from data store 165. For example, the processing device 102 can utilize reinforcement learning techniques to train the ML model 104. In at least one embodiment, the processing logic 102 can provide training data and a current indication of a current location (e.g., a current state) for performing a respective operation and train the ML model 104 to predict thermal and energy usage of performing the respective operation at a different location. In such embodiments, the processing logic 102 can also train the ML model to select an optimal location (e.g., a desired location) based on the thermal and energy conditions provided—e.g., the ML model 104 can be trained to predict an optimal location that will consume a least amount of energy to perform the respective operation. In some embodiments, the data store 165 can be outside the data center manager 128—e.g., the data store 165 can be included in a rack 112 or be remote and coupled to the data center manager 128 via network 103. The processing device 102 can analyze the thermal information data at data store 165 and utilize the ML model 104 to predict a node to execute an operation at that is the most optimal for a given thermal condition. The data center manager 128 can include a collection service for collecting the thermal information for one or more computing devices 116 or nodes in the data center 110. In at least one embodiment, the collection service is used by the data center manager 128 for collecting thermal information for training the ML model 104 and for use by the ML model 104 after training. In some embodiments, the processing device 102 can receive the thermal information from the racks 112. The processing device 102 or the interface 150 can store the thermal information in the data store 165. By utilizing the ML model 104, the scheduler 160 can schedule operations that optimize for thermal conditions and improve the efficiency of the data center 110.

Figure 2:
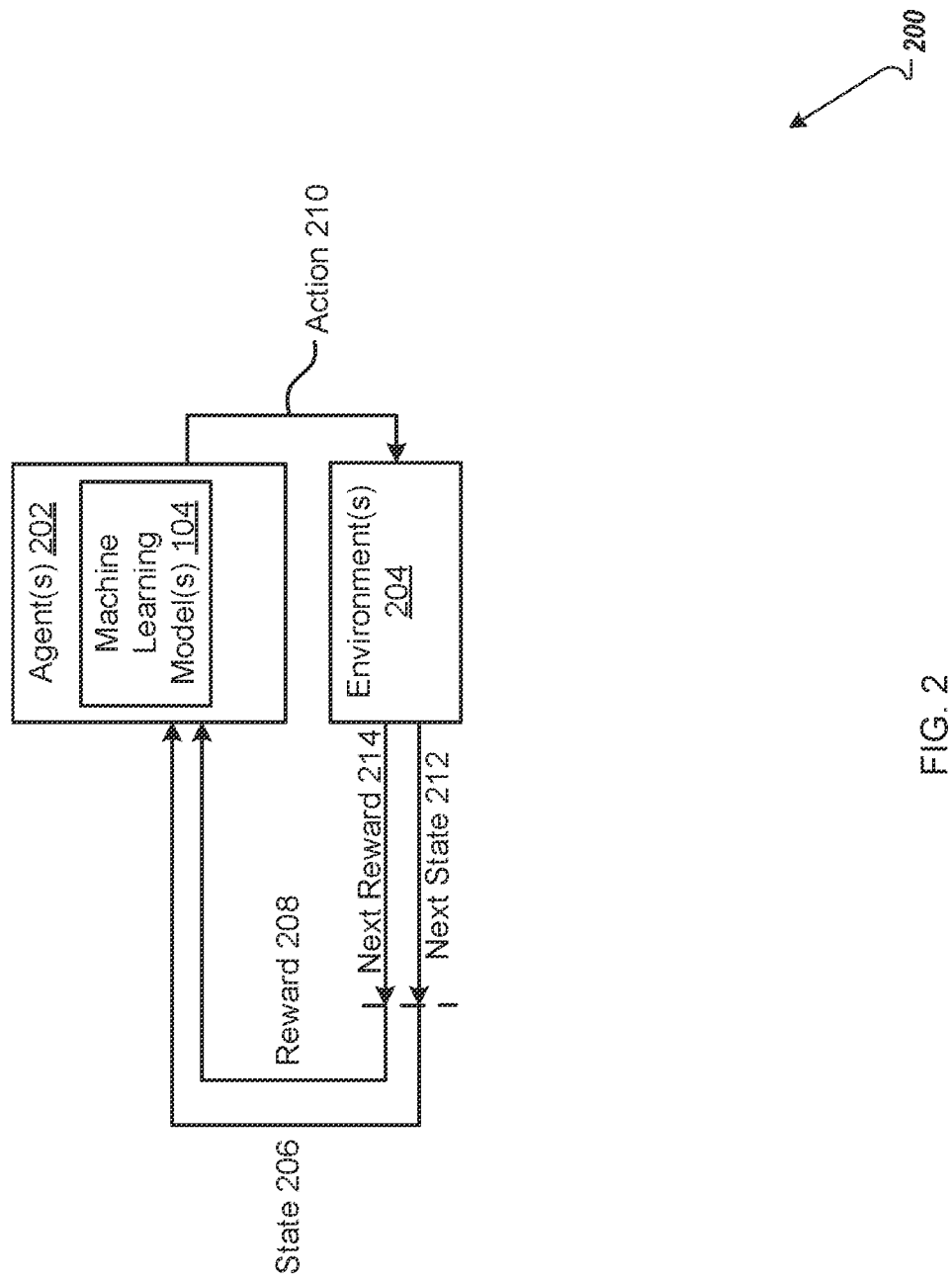
FIG. 2 illustrates an example system architecture for reinforcement learning, in accordance with at least some embodiments.

FIG. 2 illustrates a system 200 for performing reinforcement learning to predict a node most optimal to execute an operation at based on thermal conditions provided, according to at least one embodiment. In some embodiments, the system 200 includes an agent 202 (e.g., an actor) and an environment 204—e.g., a simulated environment. The agent 202 trains one or more machine learning models (e.g., ML model(s) 104) which can be examples of a Q-network (e.g., or a deep Q-network (DQN)). The system 200 can be located in the processing device 102 as described with reference to FIG. 1—e.g., within the scheduler 160.

Reinforcement learning (RL) is a class of algorithms applicable to sequential decision making tasks. In some embodiments, the RL makes use of the Markov Decision Process (MDP) formalism where an agent 202 attempts to optimize a function in its environment 204. An MDP can be completely described by a state space S (with states $s \in S$), an action space A ($a \in A$), a transition function T: $S \times A \rightarrow S$ and a reward function R: $S \times A \rightarrow \mathbb{R}$ In an MDP, an episode evolves over discrete time steps t=0, 1, 2, ..., n, where the agent 202 observes a state $s_t$ (206) and responds with an action $a_t$ (210) using a policy $\pi(a_t|s_t)$. The environment 204 provides to the agent 202 the next state $s_{t+1} \sim T(s_t, a_t)$ 212 and the reward $r_t = R(s_t, a_t)$ 214. The agent 202 is tasked with maximizing the return (cumulative future rewards) by learning an optimal policy $\pi^*$.

A Q-network may be trained via a process referred to as Q-learning. Q learning is a reinforcement learning process that causes a Q-network to perform a sequence of actions that will eventually generate a maximum total reward. This total reward is also called the Q-value. A function for computing the Q value may be as follows:

$$Q(s_t, a_t) \leftarrow r_t + \gamma \max_a Q(s_{t+1}, a)$$

The above equation states that the Q-value yielded from being at state $s_t$ (206) and performing action $a_t$ (210) is the immediate reward $r(s_t, a_t)$ (214) plus the highest Q-value possible from the next state $s_{t+1}$ (212), state where $\gamma$ is the discount factor which controls the contribution of rewards further in the future. The recursive definition of Q-functions allows the expression of $Q(s_{t+1}, a_{t+1})$ to be unrolled into future states, as follows:

$$Q(s_t, a_t) = r_t + \gamma r_{t+1} + \ldots + \gamma^{n-1} r_{t+n-1} + \gamma^n Q(s_{t+n}, a_{t+n})$$

The Q-network learns to predict $Q(s_t, a_t)$ by performing the following update step:

$$Q(s_t, a_t) \leftarrow Q(s_t, a_t) + \alpha[r_{t+1} + \gamma \max_a Q(S_{t+1}, a) - Q(s_t, a_t)]$$

where $\alpha$ represents learning rate or step size, which controls to what extent newly acquired information overrides old information.

In embodiments, the Q value of a state-action pair $(s_t, a_t)$ under a policy $\pi$ is defined to be the expected return if the action $a_t$ 210 is taken at state $s_t$ 206 and future actions are taken using the policy $\pi$, as set forth below:

$$Q^\pi(s_t, a_t) = \mathbb{E}\ r_t + \gamma r_{t+1} + \gamma^2 r_{t+2} + \ldots \ |, \gamma \in [0,1]$$

In embodiments, the discount factor $\gamma \in [0,1]$ balances short-term versus long-term rewards. The Q-learning algorithm may start the agent 202 with a random policy and uses the experience gathered during its interaction with the environment $(s_t, a_t, r_t, s_{t+1})$ 204 to iterate towards an optimal policy by updating Q with a learning rate $\alpha \in [0, 1]$:

$$Q(s_t, a_t) \leftarrow 1(1 - \alpha) * Q(s_t, a_t) + \alpha * (r_t + \gamma \max_{a'} Q(s_{t+1}, a'))$$

The policy for a Q-learning agent 202 may be represented as $\pi(\cdot|s_t) = \text{argmax}Q(s_t, a)$. In one embodiment, a $\epsilon$-greedy policy, where random actions a are chosen with a probability E to increase exploration in the state space is used. In one embodiment, $\epsilon$ is annealed to zero during the course of training and is zero when performing evaluation. In one embodiment, multiple explorations can be done in parallel with a range of $\epsilon$ values.

Deep Q-learning is an extension of Q-learning that implements one or more machine learning models (e.g., machine learning model 104) such as neural networks to essentially approximate the aforementioned Q values. In deep Q-learning, one or more artificial neural networks (e.g., machine learning model 104) may be used to approximate the aforementioned Q-value function. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. modifications to design state of prefix circuits). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In embodiments, training of a deep Q-network (DQN) may be stabilized using a second target network to estimate the Q values of $(s_{t+1}, a')$. The second target network may be updated less frequently than a first network. In embodiments, the DQN may sample an experience replay buffer. In one embodiment, a first machine learning model 104 is used to determine a prediction and a second machine learning model 104 is used to determine a target. The second machine learning model 104 may have a same architecture as the first machine learning model 104 in embodiments. However, in an embodiment the second machine learning model 104 may have frozen parameters while the first machine learning model 104 may have variable parameters. In an embodiment, the second machine learning model 104 is updated less frequently than the first machine learning model 104. In one embodiment, a double-DQN algorithm is used, which may further improve training by reducing overestimations in the DQN. In at least one embodiment, the first machine learning model 104 can be used to predict thermal and energy usage associated with executing an operation at a respective location—e.g. the first machine learning model 104 can predict thermal and energy usage of performing the operation at a respective node. In some embodiments, the second machine learning model 104 can determine which location is closet to target thermal and energy conditions—e.g., the second machine learning model 104 could determine which node would use a least amount of energy to perform the operation.

In some examples, system 200 can be utilized to select or designate a node to execute an operation, where the node is selected to optimize a thermal condition provided. For example, the scheduler 160 can receive a request to execute an operation. In some embodiments, the request can include a location to execute the operation at. In other embodiments, the request can refrain from providing a location. In some embodiments, the request can also include a thermal condition that should be optimized for—e.g., the request can indicate to select a location that enables efficient cooling or a location that utilizes a least amount of energy. In some embodiments, the scheduler 160 or agent 202 can be programmed to optimize for the thermal condition—e.g., the scheduler 160 or agent 202 can be programmed to increase cooling efficiency or select a node that causes a least amount of temperature increase in a rack or the data center as a whole. In at least one embodiment, the agent 202 is configured to modify the location of the operation (e.g., select a second location) by taking an action 210 and train the machine learning model 104 based on the modifications and action 210. In some embodiments, agent 202 can execute on a processing device such as a graphical processing unit (GPU) or a central processing unit (CPU). In some embodiments, the system 200 can include multiple agents 202 that may operate in parallel and share learning. Each agent 202 may execute on the same or a different processing device and/or the same or a different core of a processing device.

In at least one embodiment, the environment 204 can be configured to receive action 210. In some embodiments, the environment 204 can simulate the action 210 to determine a next state 212 and next reward 214. For example, the environment 204 can simulate the action 210 generate state 212 and predict a thermal condition at the second location responsive to the action 210. The environment 204 can compare a value of the thermal condition for the state 206 and a value of the thermal condition for the next state 212 to generate the next reward 214. For example, the environment 204 can output a positive next reward 214 if the value for the thermal condition for the next state 212 is closer to a target than the value for the thermal condition for state 206. On the other hand, the environment 204 can output a negative next reward 214 if the value for the thermal condition associated with the next state 212 is further from the target than the value of the thermal condition for the state 206. The environment 204 can output the next state 212 and next reward 214. Accordingly, the agent 202 can receive the next reward 214 and update the machine learning model 204. The agent 202 can also receive the next state 212 and take another action 210 to send to the environment 204.

For example, the scheduler 160 can receive a request or be programmed to optimize for temperature of the node—e.g., the scheduler 160 can train ML model 204 to select nodes for an operation in a manner that causes a least amount of increase in temperate at the node, at a rack, or at a data center when executing the operation. In such embodiments, the agent 202 can take an action 210 and select a first node to execute the operation at. The environment 204 can receive the action and simulate running the operation at the first node to predict a first temperature associated with performing the operation at the first node. In response to predicting the first temperature, the environment 204 can provide a next state 212 to the agent 202. In some embodiments, the agent 202 can receive the next state 212 and perform a second action 210 to select a second node to execute the operation at. The environment 204 can receive the second action 210 and simulate executing the operation at the second node to predict a second temperature associated with performing the operation at the second node. In such embodiments, the environment 204 can compare the first temperature with the second temperature. If the environment 204 determines the second temperature is less than the first temperature, the environment 204 can generate a positive next reward 214. If the environment determines the second temperature is greater than the first temperature, the environment 204 can generate a negative next reward 214. Accordingly, the agent 202 can update (e.g., re-train) the machine learning model 104 in response to receiving the next reward 214—e.g., the agent 202 can re-train the machine learning model 104 to take similar actions 210 if the next reward 214 is positive or re-train the machine learning model 104 to take different actions 210 if the next reward 214 is negative. The system 200 can continue to simulate actions 210 until the actions 210 no longer result in positive rewards 214 (e.g., the system is fully optimized) or until actions 210 result in a temperature that satisfies a target temperature threshold. In some embodiments, actions 210 can include selecting multiple graphics processing units (GPUs) within a same node, selecting multiple GPUs across different nodes (e.g., across adjacent nodes or nodes that not adjacent), selecting multiple GPUs across different racks, etc.

In another example, the scheduler 160 can receive a request or be programmed to optimize for a water temperature—e.g., the scheduler 160 can train ML model 204 to select nodes for an operation in a manner that causes the water temperate to reach a certain threshold. For example, in some embodiments the water within the data center can be utilized for downstream tasks—e.g., for melting snow surrounding the data center. In such embodiments, agent 202 can train the ML model 104 such that executing operations in the data center enable the water temperature to reach a threshold value sufficient for melting snow. As described above, the agent 202 can take an action 210 and select a first node to execute the operation at. The environment 204 can receive the action and simulate running the operation at the first node to predict a first water temperature associated with performing the operation at the first node. In response to predicting the first water temperature, the environment 204 can provide a next state 212 to the agent 202. In some embodiments, the agent 202 can receive the next state 212 and perform a second action 210 to select a second node to execute the operation at. The environment 204 can receive the second action 210 and simulate executing the operation at the second node to predict a second water temperature associated with performing the operation at the second node. In such embodiments, the environment 204 can compare the first water temperature with the second water temperature. If the environment 204 determines the second water temperature is closer to the target threshold than the first water temperature, the environment 204 can generate a positive next reward 214. If the environment determines the second water temperature is further away from the target threshold than the first water temperature, the environment 204 can generate a negative next reward 214. Accordingly, the agent 202 can update (e.g., re-train) the machine learning model 104 in response to receiving the next reward 214—e.g., the agent 202 can re-train the machine learning model 104 to take similar actions 210 if the next reward 214 is positive or re-train the machine learning model 104 to take different actions 210 if the next reward 214 is negative.

In some embodiments, the agent 202 can train the ML model 104 for any number of thermal conditions. For example, the agent 202 can train the ML model 104 to optimize for any of the following thermal or energy conditions (or for any combination of the following thermal conditions); a cooling condition associated with the operation, total data center energy consumption condition, water cooling condition, heat dissipation condition, air flow condition, condition associated with temperature, condition associated with weather forecasts, condition associated with location of adjacent operations, condition associated with location of all operations currently executing at the data center, thermal equilibrium conditions, electricity consumption condition, condition associated with electricity costs, a condition associated with a time associated with the operation, condition associated with a type of operation, or a condition associated with an amount of energy associated with executing the job. For example, the ML model 104 can take into account outside weather and temperature conditions with multiday forecasting and publish confidence levels (e.g., using Bayesian methods) for energy levels. For example, the ML model 104 can predict that if a first operation is executed with these forecast conditions, an "X" amount of energy can be used in cooling with the confidence level of 60%. In examples where the forecast or prediction is wrong, the ML model 104 can be re-trained. In other examples, the ML model 104 can take into account electricity costs at different times through the day. In such examples, the ML model 104 can be trained to select times to execute operations when electricity is cheapest (e.g., at night).

In some embodiments, the processing device 102 can utilize a different reinforcement learning model or algorithm associated with each thermal condition or each possible combination of thermal conditions. For example, the processing device 102 can utilize a first reinforcement learning technique for optimizing for temperature and a second reinforcement learning technique for optimizing for electricity costs.

Figure 3:
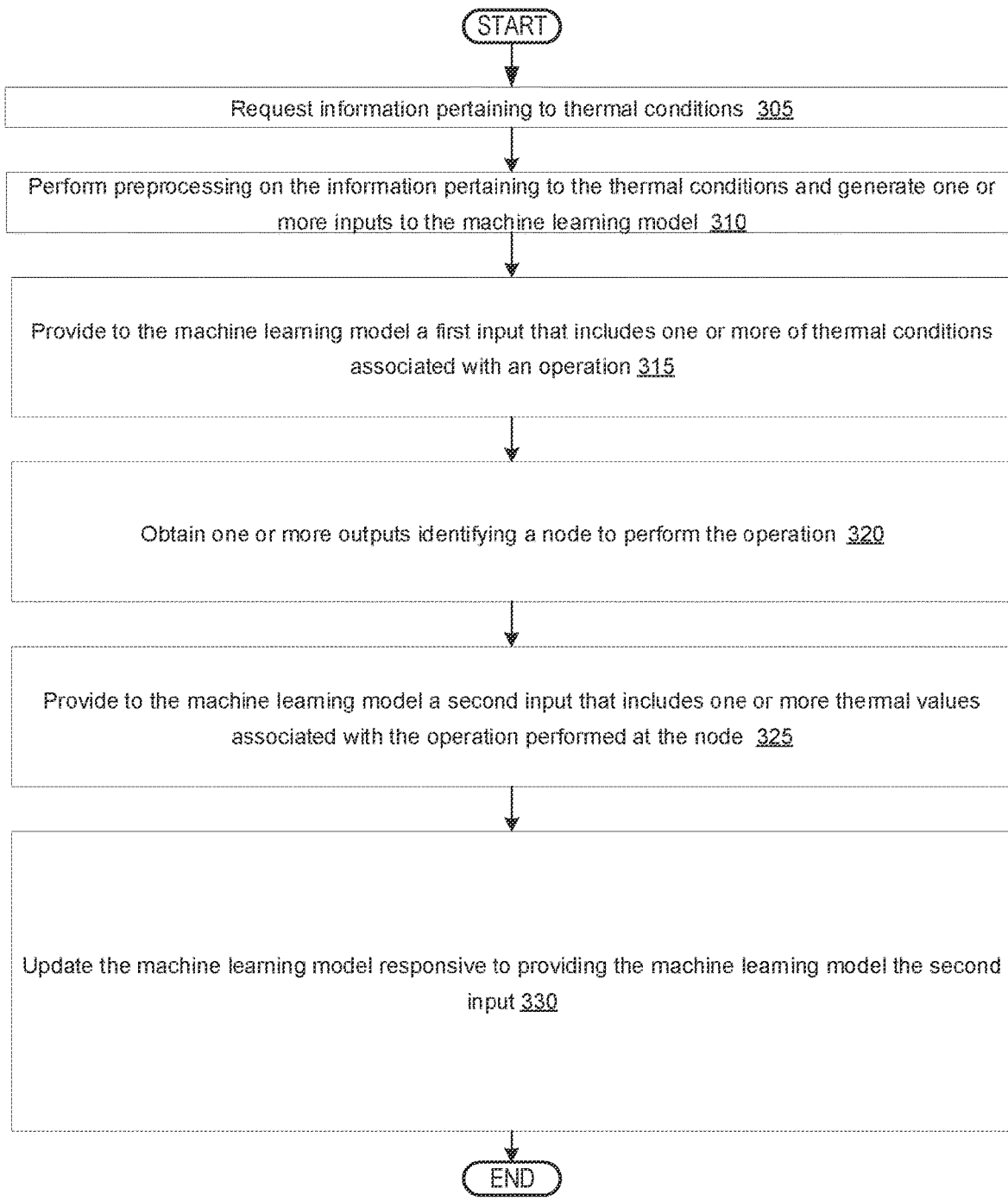
FIG. 3 illustrates a flow diagram of an example method for data center job scheduling using machine learning, in accordance with at least some embodiments.

FIG. 3 illustrates a flow diagram of a method 300 for utilizing machine learning for job scheduling in a data center, according to at least one embodiment. The method 300 can be performed by processing logic comprising hardware, software, firmware, or any combination thereof. In at least one embodiment, the method 300 is performed by system 100 or system 200 as described with reference to FIGS. 1-2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method utilizing machine learning for job scheduling in a data center are possible.

At operation 305, processing logic can request information pertaining to thermal parameters. In some embodiments, processing logic can train a machine learning (ML) model (e.g., machine learning model 104 as described with reference to FIG. 1). In such embodiments, the processing logic can request or receive thermal parameters or thermal information to train the ML model. In some embodiments, the processing logic can request at least one of the following thermal parameters or thermal information; a cooling parameters associated with the operation, total data center energy consumption parameters, water cooling parameters, heat dissipation parameters, air flow parameters, parameters associated with temperature, parameters associated with weather forecasts, parameters associated with location of adjacent operations, parameters associated with location of all operations currently executing at the data center, thermal equilibrium parameters, electricity consumption parameters, parameters associated with electricity costs, parameters associated with a time associated with the operation, parameters associated with a type of operation, or a parameter associated with an amount of energy associated with executing the job. In some embodiments, the information requested can also include how many steps are in the operation (e.g., number of individual operations in a job request), types of operations to be performed (e.g., visualization, graphics, deep learning training, inference, computer-aided design (CAD), etc), an estimation of how much energy an operation should take, or how much data will be transferred (e.g., including which locations the data will be retrieved from). Accordingly, the ML model 104 can be trained for not only thermal conditions, but also to efficiently distribute parallel job requests. Additionally, the ML model 104 can be trained to factor in data locality—e.g., the ML model 104 can be trained to reduce a distance data travels or transfers within the data center. In some embodiments, the processing logic can train the ML model 104 to map between the thermal conditions and the energy consumed (e.g., cooling provided). That is, the ML model 104 can be trained to predict how much energy is consumed or cooling is provided at a respective node. By learning the energy consumed or cooling provided, the ML model 104 can select a node to execute an operation at in response to receiving a thermal condition.

At operation 310, the processing logic can perform preprocessing on the information pertaining to the thermal conditions and generate one or more inputs to the machine learning model. In at least one embodiment, the processing logic can be programmed to optimize for a particular thermal condition (or for a combination of certain thermal conditions). Accordingly, the processing logic can preprocess the thermal information received and provide the appropriate thermal conditions as inputs to the ML model 104. For example, the processing logic can be programmed to optimize for heat dissipation in the data center. In such examples, the processing logic can filter the information received and select information related to heat dissipation. This can enable the processing logic to generate one or more inputs to provide the machine learning model. In some embodiments, the processing logic can also select a reinforcement technique for the ML model 104 to utilize based on the thermal condition. For example, the processing logic can select a reinforcement learning technique associated with optimizing heat dissipation. By using a number of reinforcement learning techniques corresponding to different thermal conditions (or combinations of thermal conditions), the system 100 can schedule jobs in a flexible manner. That is, the scheduler 160 can select the optimal node(s) for any number of scenarios. For example, the scheduler 160 could select a node for performance, for saving electric costs, based on weather conditions, for downstream tasks, to maintain temperatures, etc.

At operation 315, the processing logic provides the machine learning model a first input that includes one or more thermal conditions associated with an operation. For example, the processing logic can indicate to the ML model 104 to optimize for cooling and air flow. In some embodiments, the processing logic can also provide all input all relevant information associated with the one or more thermal conditions. For example, the processing logic can provide relevant information associated with air flow to the ML model 104—e.g., current air flow rate, current nodes executing a job, number of nodes associated with the received job request, available nodes etc. In other embodiments, the processing logic could provide current electricity costs, future predicted electricity costs, etc., if the thermal condition is related to electricity costs.

At operation 320, the processing logic can obtain one or more outputs identifying a node to perform the operation 320. That is, the ML model 104 can output an optimal node to perform the operation based on the thermal conditions provided. In at least one embodiment, the processing logic can inform the scheduler of the node selected by the ML model 104. In such embodiments, the job scheduler can schedule the operation to be executed at the node selected by the ML model 104.

At operation 325, the processing logic can provide the machine learning model a second input that includes one or more thermal values associated with the operation at the node. In some embodiments, after the operation is performed at the node selected by the ML model 104, the processing logic can request information pertaining to the operation. For example, the processing logic can request the actual heat dissipation rate or the actual temperature of the node during the operation. In such examples, the processing logic can compare the actual thermal values (e.g., thermal or energy results) with the predicted results of the ML model 104 generated at operation 320. If the processing logic determines the predicted results are different than the actual results, the processing logic can provide the second input to the ML model 104 and proceed to operation 330.

At operation 330, the processing logic can update the machine learning model responsive to providing the machine learning model the second input. In some embodiments, the processing logic can re-train the ML model 104 if the predicted results differ from the actual results—e.g., the processing logic can re-train the ML model 104 in response to comparing actual results with the predicted results of the ML model 104. In at least one embodiment, the processing logic can update the ML model 104 as described with reference to FIG. 2, e.g., provide a negative reward to the agent to incentivize different actions by the ML model 104. By utilizing reinforcement techniques, the ML model 104 can continually improve and select the most optimal node based on the thermal condition provided.

Figure 4:
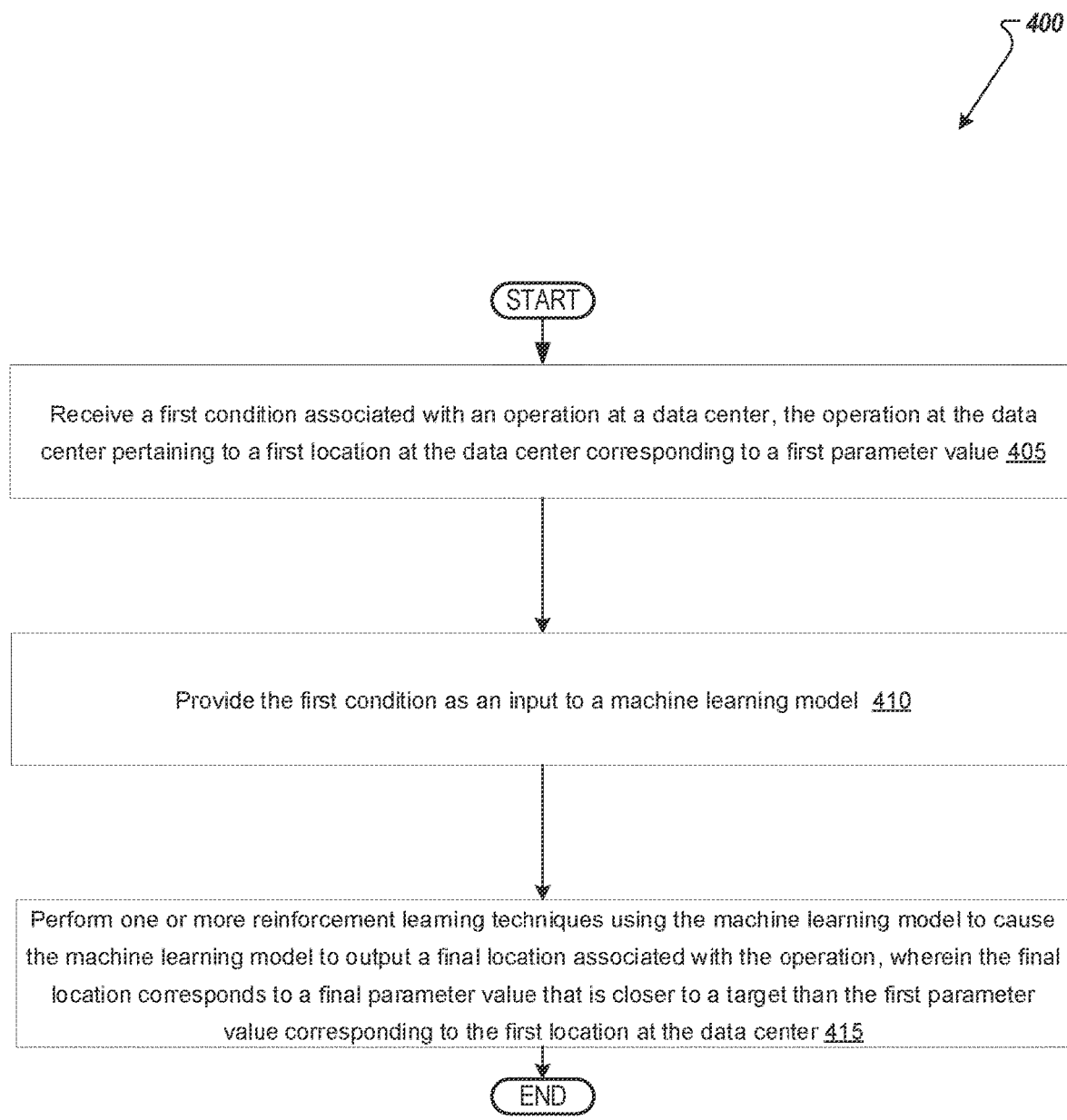
FIG. 4 illustrates a flow diagram of an example method for data center job scheduling using machine learning, in accordance with at least some embodiments.

FIG. 4 illustrates a flow diagram of a method 400 for utilizing machine learning for job scheduling in a data center, according to at least one embodiment. The method 400 can be performed by processing logic comprising hardware, software, firmware, or any combination thereof. In at least one embodiment, the method 400 is performed by system 100 or system 200 as described with reference to FIGS. 1-2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method utilizing machine learning for job scheduling in a data center are possible.

At operation 405, processing logic receives a first condition associated with an operation at a data center, the operation at the data center pertaining to a first location and corresponding to a first parameter value. In some embodiments, the processing logic can receive a job request or operation request to execute at the data center. In at least one embodiment, the request can include the first condition. In some embodiments, the processing logic can be programmed with a plurality of conditions and select the first condition in response to the request—e.g., the processing logic can be programmed to optimize for heat dissipation and air flow and select air flow based on the type of request.

In at least one embodiment, the first condition represents at least one of a cooling condition associated with the operation, total data center energy consumption condition, water cooling condition, heat dissipation condition, air flow condition, condition associated with temperature, condition associated with weather forecasts, condition associated with location of adjacent operations, condition associated with location of all operations currently executing at the data center, thermal equilibrium conditions, electricity consumption condition, condition associated with electricity costs, a condition associated with a time associated with the operation, condition associated with a type of operation, or a condition associated with an amount of energy associated with executing the job.

In at least one embodiment, the processing logic can train a machine learning model prior to receiving the condition or job request. In such embodiments, the processing logic can generate training data comprising an amount of energy associated with executing the operation and at least one of a cooling parameter associated with the operation, total data center energy consumption parameter, water cooling parameter, heat dissipation parameter, air flow parameter, parameter associated with temperature, parameter associated with weather forecasts, parameter associated with location of adjacent operations, parameter associated with location of all operations currently executing at the data center, thermal equilibrium parameter, electricity consumption parameter, parameter associated with electricity costs, a parameter associated with a time associated with the operation, data transfer associated with the operation, or type of operation and train the machine learning model with the training data. That is, the processing logic can map a respective thermal input (e.g., parameter) to how much energy is consumed, cooling is provided, or a temperature corresponding to the operation (e.g., water temperature or temperature at a node). In some embodiments, the processing logic can map the respective parameter to additional thermal values including but not limited to air flow rate, thermal equilibrium conditions, energy costs, heat dissipation rates, total energy consumed, etc.

At operation 410, the processing logic can provide the first condition as an input to a machine learning model. In some embodiments, the processing logic can also provide one or more additional constraints of a plurality of conditions (the plurality including the first condition) to the machine learning model. That is, the processing logic can provide a combination of thermal conditions or energy conditions to the machine learning model. In some embodiments, the machine learning model is trained to output a final location based on receiving the first condition and the one or more additional conditions of the plurality of conditions.

At operation 415, the processing logic can perform one or more reinforcement learning techniques using the machine learning model to cause the machine learning model to output a indication of a final location associated with the operation. In at least one embodiment, the indication of the final location could be a location, a specific node to execute the operation at, a distance from a current location selected, etc. In such embodiments, the final location can correspond to a final parameter value that is closer to a target than the first parameter value corresponding to the first location at the data center. In some embodiments, the processing logic is to select the one or more reinforcement learning techniques from a plurality of reinforcement learning techniques, where the plurality of reinforcement learning techniques are associated with a plurality of conditions.

In at least on embodiment, the processing logic performs the one or more reinforcement learning techniques by processing the first condition associated with the operation using the machine learning model, where the machine learning model is trained output a second location to execute the operation that is a modification of the first location. In such embodiments, the processing logic can determine the first parameter value for the first location and a second parameter value for the second location. For example, the first condition can be energy consumption—e.g., the machine learning model can be trained to optimize for energy consumption. In such embodiments, the processing logic can determine an amount of energy consumed at the first location and an amount of energy consumed at the second location. In some embodiments, the processing logic can re-train (e.g., update) the machine learning model based on a comparison of the first parameter value and the second parameter value—e.g., the processing logic can update the machine learning model based making the comparison between the first location and the second location to determine which of the first location or the second location is closer to the target. In some embodiments, the processing logic can process the first location or the second location using the re-trained machine learning model, where the re-trained machine learning model outputs a third location of the operation that is a modification of the first location or the second location. That is, the processing logic can select the first location or the second location based on whether the first parameter value or the second parameter value is closer to the target.

In some embodiments, the processing logic can execute the operation (e.g., job request) at the final location in response to the machine learning model outputting the final location. In such embodiments, the processing logic can receive a second parameter value associated with executing the operation at the final location. In some embodiments, the processing logic can determine the second parameter value is different than the final parameter value in response to receiving the second parameter value. In at least one embodiment, the processing logic can re-train the machine learning model based on determining that the second parameter value is different than the final parameter value. In at least one embodiment, the final parameter value is a prediction of what parameter value will be associated with the final location. In some embodiments, the second parameter value is an actual parameter value associated with executing the operation at the final location. That is, the processing logic can update the machine learning model based on actual results differing from predicted results as described with reference to FIG. 3.

Figure 5A:
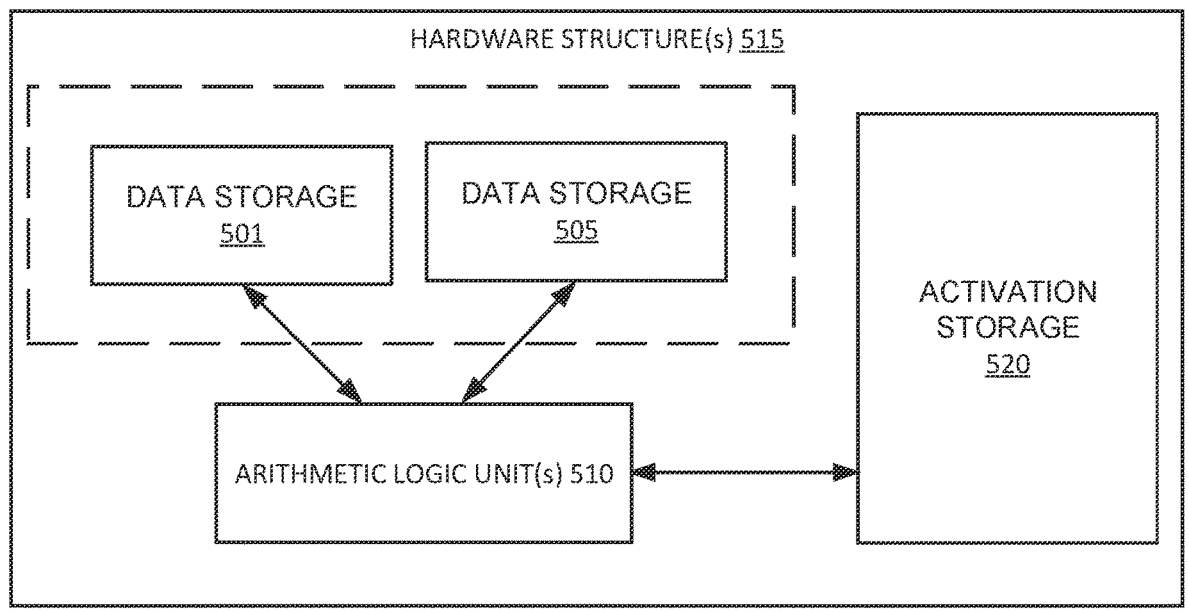
FIG. 5A illustrates an inference and/or training logic, in accordance with at least some embodiments.

FIG. 5A illustrates inference and/or training logic 515 used to perform inferencing and/or training operations associated with one or more embodiments. Details regarding inference and/or training logic 515 are provided below in conjunction with FIGS. 5A and/or 5B.

In at least one embodiment, inference and/or training logic 515 may include, without limitation, code and/or data storage 501 to store forward and/or output weight and/or input/output data, and/or other parameters to configure neurons or layers of a neural network trained and/or used for inferencing in aspects of one or more embodiments. In at least one embodiment, training logic 515 may include, or be coupled to code and/or data storage 501 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment, code and/or data storage 501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 501 may be included with other on-chip or off-chip data storage, including a processor's L1, L2, or L3 cache or system memory.

In at least one embodiment, any portion of code and/or data storage 501 may be internal or external to one or more processors or other hardware logic devices or circuits. In at least one embodiment, code and/or code and/or data storage 501 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 515 may include, without limitation, a code and/or data storage 505 to store backward and/or output weight and/or input/output data corresponding to neurons or layers of a neural network trained and/or used for inferencing in aspects of one or more embodiments. In at least one embodiment, code and/or data storage 505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 515 may include, or be coupled to code and/or data storage 505 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 505 may be included with other on-chip or off-chip data storage, including a processor's L1, L2, or L3 cache or system memory. In at least one embodiment, any portion of code and/or data storage 505 may be internal or external to on one or more processors or other hardware logic devices or circuits. In at least one embodiment, code and/or data storage 505 may be cache memory, DRAM, SRAM, non-volatile memory (e.g., Flash memory), or other storage. In at least one embodiment, choice of whether code and/or data storage 505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 501 and code and/or data storage 505 may be separate storage structures. In at least one embodiment, code and/or data storage 501 and code and/or data storage 505 may be same storage structure. In at least one embodiment, code and/or data storage 501 and code and/or data storage 505 may be partially same storage structure and partially separate storage structures. In at least one embodiment, any portion of code and/or data storage 501 code and/or data storage 505 may be included with other on-chip or off-chip data storage, including a processor's L1, L2, or L3 cache or system memory.

In at least one embodiment, inference and/or training logic 515 may include, without limitation, one or more arithmetic logic unit(s) ("ALU(s)") 510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 520 that are functions of input/output and/or weight parameter data stored in code and/or data storage 501 and/or code and/or data storage 505. In at least one embodiment, activations stored in activation storage 520 are generated according to linear algebraic and or matrix-based mathematics performed by ALU(s) 510 in response to performing instructions or other code, wherein weight values stored in code and/or data storage 505 and/or code and/or data storage 501 are used as operands along with other values, such as bias values, gradient information, momentum values, or other parameters or hyperparameters, any or all of which may be stored in code and/or data storage 505 or code and/or data storage 501 or another storage on or off-chip.

In at least one embodiment, ALU(s) 510 are included within one or more processors or other hardware logic devices or circuits, whereas in another embodiment, ALU(s) 510 may be external to a processor or other hardware logic device or circuit that uses them (e.g., a co-processor). In at least one embodiment, ALUs 510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 501, code and/or data storage 505, and activation storage 520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 520 may be cache memory, DRAM, SRAM, non-volatile memory (e.g., Flash memory), or other storage. In at least one embodiment, activation storage 520 may be completely or partially within or external to one or more processors or other logical circuits. In at least one embodiment, choice of whether activation storage 520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 515 illustrated in FIG. 5A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5A may be used in conjunction with central processing unit ("CPU") hardware, graphics processing unit ("GPU") hardware or other hardware, such as data processing unit ("DPU") hardware, or field programmable gate arrays ("FPGAs").

Figure 5B:
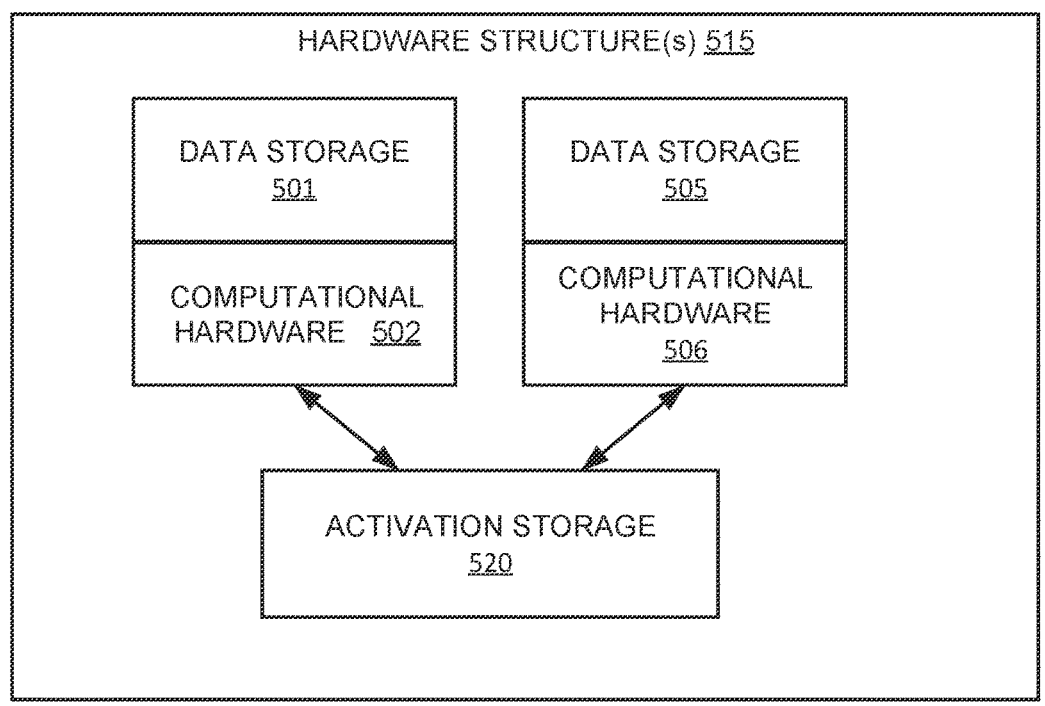
FIG. 5B illustrates an inference and/or training logic, in accordance with at least some embodiments.

FIG. 5B illustrates inference and/or training logic 515, according to at least one or more embodiments. In at least one embodiment, inference and/or training logic 515 may include, without limitation, hardware logic in which computational resources are dedicated or otherwise exclusively used in conjunction with weight values or other information corresponding to one or more layers of neurons within a neural network. In at least one embodiment, inference and/or training logic 515 illustrated in FIG. 5B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 515 includes, without limitation, code and/or data storage 501 and code and/or data storage 505, which may be used to store code (e.g., graph code), weight values and/or other information, including bias values, gradient information, momentum values, and/or other parameter or hyperparameter information. In at least one embodiment illustrated in FIG. 5B, each of code and/or data storage 501 and code and/or data storage 505 is associated with a dedicated computational resource, such as computational hardware 502 and computational hardware 506, respectively. In at least one embodiment, each of computational hardware 502 and computational hardware 506 comprises one or more ALUs that perform mathematical functions, such as linear algebraic functions, only on information stored in code and/or data storage 501 and code and/or data storage 505, respectively, result of which is stored in activation storage 520.

In at least one embodiment, each of code and/or data storage 501 and 505 and corresponding computational hardware 502 and 506, respectively, correspond to different layers of a neural network, such that resulting activation from one "storage/computational pair 501/502" of code and/or data storage 501 and computational hardware 502 is provided as an input to "storage/computational pair 505/506" of code and/or data storage 505 and computational hardware 506, in order to mirror conceptual organization of a neural network. In at least one embodiment, each of storage/computational pairs 501/502 and 505/506 may correspond to more than one neural network layer. In at least one embodiment, additional storage/computation pairs (not shown) subsequent to or in parallel with storage computation pairs 501/502 and 505/506 may be included in inference and/or training logic 515.

Figure 6:
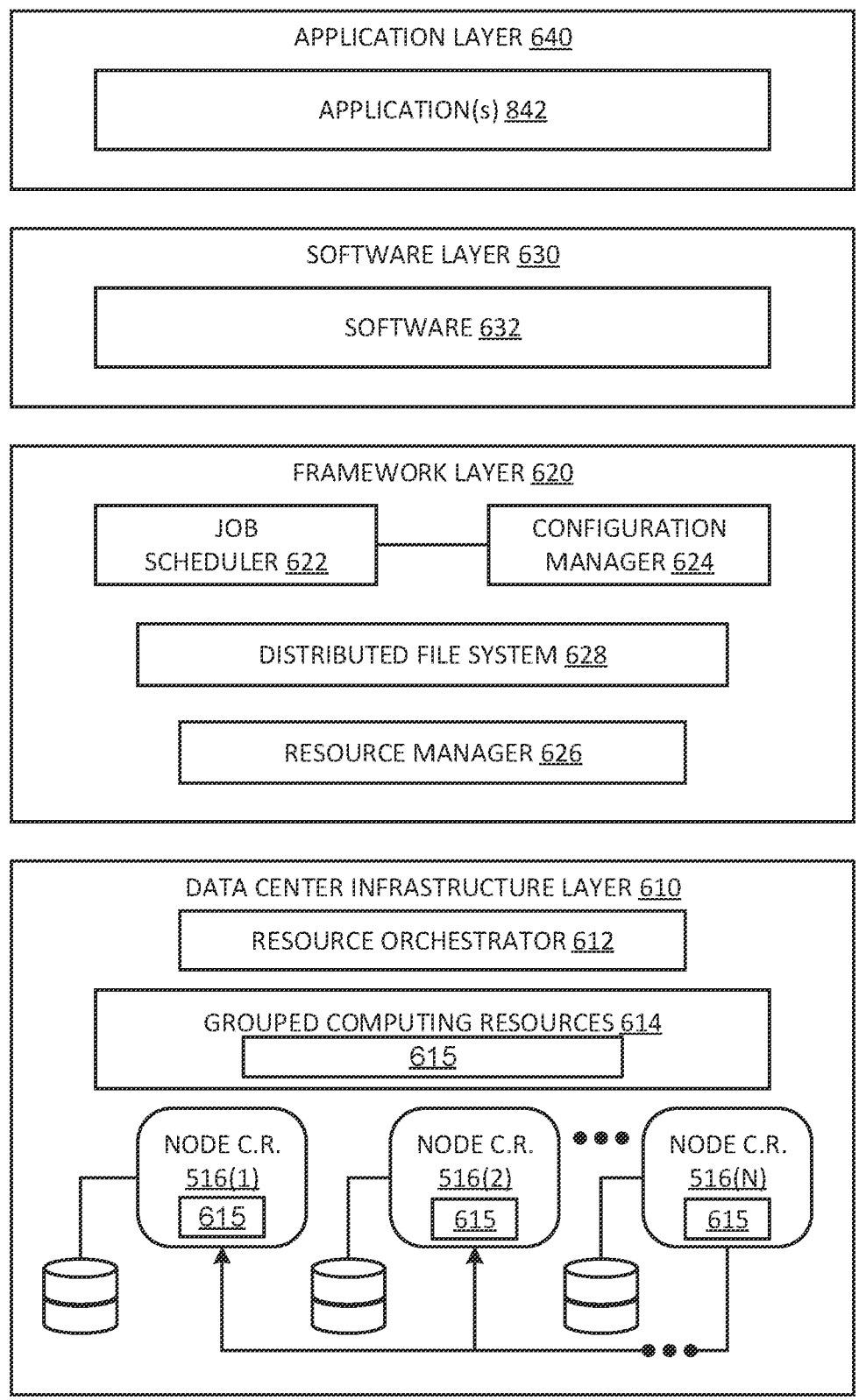
FIG. 6 illustrates an example data center system, in accordance with at least some embodiments.

FIG. 6 illustrates an example data center 600, in which at least one embodiment may be used. In at least one embodiment, data center 600 includes a data center infrastructure layer 610, a framework layer 620, a software layer 630, and an application layer 1240.

In at least one embodiment, as shown in FIG. 6, data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator may include hardware, software or some combination thereof.

In at least one embodiment, as shown in FIG. 6, framework layer 620 includes a job scheduler 622, a configuration manager 624, a resource manager 626 and a distributed file system 628. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer 620 including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resource 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 628 of framework layer 620. The one or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 628 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 624, resource manager 626, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

In at least one embodiment, data center 600 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 600. In at least one embodiment, trained machine learning models corresponding to one or more neural networks may be used to infer or predict information using resources described above with respect to data center 600 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 6 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 7:
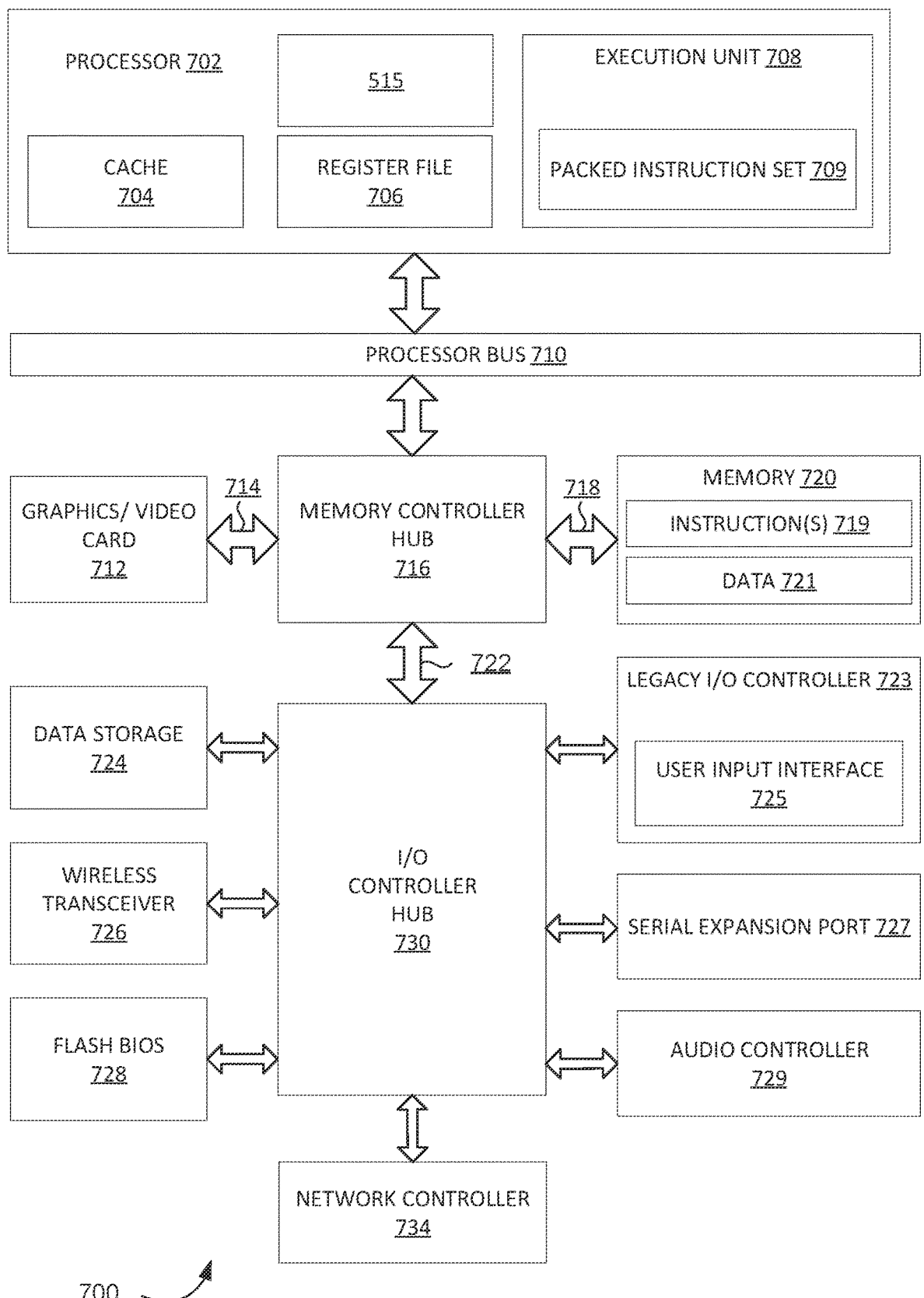
FIG. 7 illustrates a computer system, in accordance with at least some embodiments.

FIG. 7 is a block diagram illustrating an exemplary computer system, which may be a system with interconnected devices and components, a system-on-a-chip (SOC) or some combination thereof 700 formed with a processor that may include execution units to execute an instruction, according to at least one embodiment. In at least one embodiment, computer system 700 may include, without limitation, a component, such as a processor 702 to employ execution units including logic to perform algorithms for process data, in accordance with present disclosure, such as in embodiment described herein. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 700 may include, without limitation, processor 702 that may include, without limitation, one or more execution units 708 to perform machine learning model training and/or inferencing according to techniques described herein. In at least one embodiment, computer system 700 is a single processor desktop or server system, but in another embodiment computer system 700 may be a multiprocessor system. In at least one embodiment, processor 702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. Other embodiments may also include a combination of both internal and external caches depending on particular implementation and needs. In at least one embodiment, register file 706 may store different types of data in various registers including, without limitation, integer registers, floating point registers, status registers, and instruction pointer register.

In at least one embodiment, execution unit 708, including, without limitation, logic to perform integer and floating point operations, also resides in processor 702. In at least one embodiment, processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be implemented as a Dynamic Random Access Memory ("DRAM") device, a Static Random Access Memory ("SRAM") device, flash memory device, or other memory device. In at least one embodiment, memory 720 may store instruction(s) 719 and/or data 721 represented by data signals that may be executed by processor 702.

In at least one embodiment, system logic chip may be coupled to processor bus 710 and memory 720. In at least one embodiment, system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through a high bandwidth memory path 718 and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, chipset, and processor 702. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as Universal Serial Bus ("USB"), and a network controller 734, which may include in some embodiments, a data processing unit. Data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips", whereas in other embodiments, FIG. 7 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 700 are interconnected using compute express link (CXL) interconnects.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
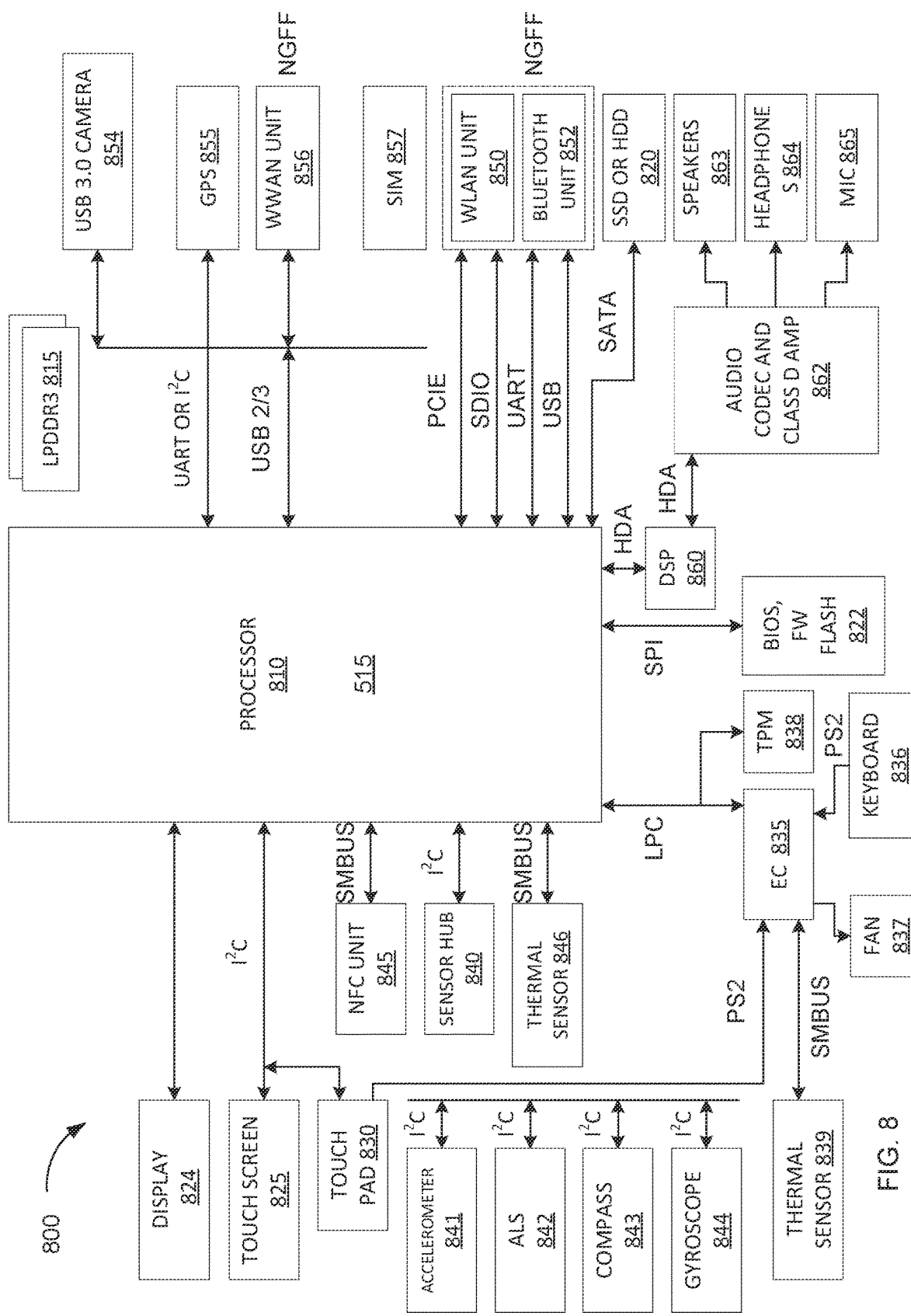
FIG. 8 illustrates a computer system, in accordance with at least some embodiments.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 800 may include, without limitation, processor 810 communicatively coupled to any suitable number or kind of components, peripherals, modules, or devices. In at least one embodiment, processor 810 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices illustrated in FIG. 8 may be interconnected with proprietary interconnects, standardized interconnects (e.g., PCIe) or some combination thereof. In at least one embodiment, one or more components of FIG. 8 are interconnected using compute express link (CXL) interconnects.

In at least one embodiment, FIG. 8 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) 855, a camera ("USB 3.0 camera") 854 such as a USB 3.0 camera, and/or a Low Power Double Data Rate ("LPDDR") memory unit ("LPDDR3") 815 implemented in, for example, LPDDR 3 standard. These components may each be implemented in any suitable manner.

In at least one embodiment, other components may be communicatively coupled to processor 810 through components discussed above. In at least one embodiment, an accelerometer 841, Ambient Light Sensor ("ALS") 842, compass 843, and a gyroscope 844 may be communicatively coupled to sensor hub 840. In at least one embodiment, thermal sensor 839, a fan 837, a keyboard 836, and a touch pad 830 may be communicatively coupled to EC 835. In at least one embodiment, speaker 863, headphones 864, and microphone ("mic") 865 may be communicatively coupled to an audio unit ("audio codec and class d amp") 862, which may in turn be communicatively coupled to DSP 860. In at least one embodiment, audio unit 864 may include, for example and without limitation, an audio coder/decoder ("codec") and a class D amplifier. In at least one embodiment, SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
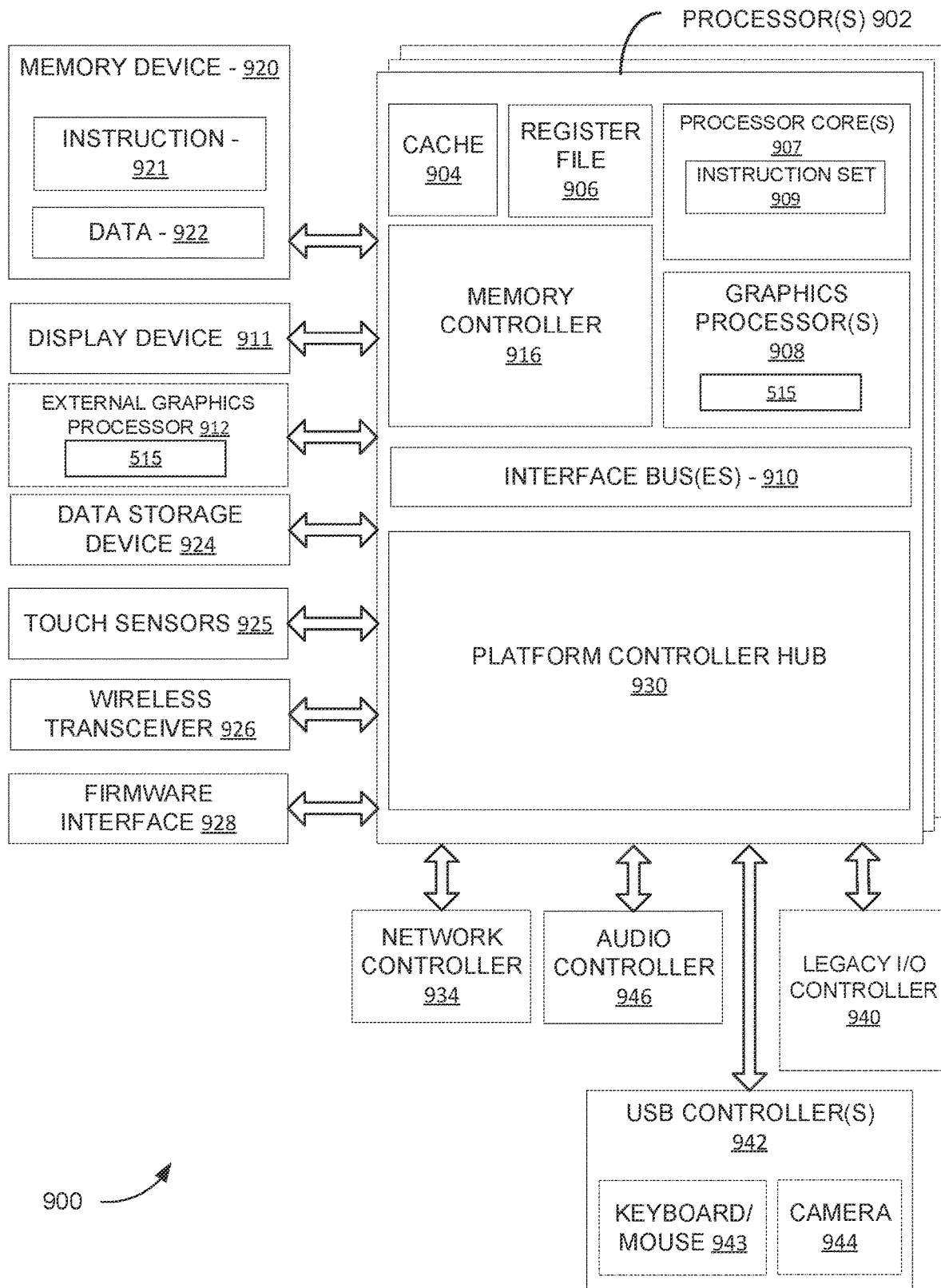
FIG. 9 illustrates at least portions of a graphics processor, in accordance with at least some embodiments.

FIG. 9 is a block diagram of a processing system, according to at least one embodiment. In at least one embodiment, system 900 includes one or more processors 902 and one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, edge, or embedded devices.

In at least one embodiment, system 900 may include, or be incorporated within a server-based gaming platform, a game console, including a game and media console, a mobile gaming console, a handheld game console, or an online game console. In at least one embodiment, system 900 is a mobile phone, smart phone, tablet computing device or mobile Internet device. In at least one embodiment, processing system 900 may also include, couple with, or be integrated within a wearable device, such as a smart watch wearable device, smart eyewear device, augmented reality device, or virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction set 909. In at least one embodiment, instruction set 909 may facilitate Complex Instruction Set Computing (CISC), Reduced Instruction Set Computing (RISC), or computing via a Very Long Instruction Word (VLIW). In at least one embodiment, processor cores 907 may each process a different instruction set 909, which may include instructions to facilitate emulation of other instruction sets. In at least one embodiment, processor core 907 may also include other processing devices, such a Digital Signal Processor (DSP).

In at least one embodiment, processor 902 includes cache memory 904. In at least one embodiment, processor 902 may have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, register file 906 is additionally included in processor 902 which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910, in one embodiment, may be a processor bus, such as a version of a Direct Media Interface (DMI) bus. In at least one embodiment, interface 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, memory device 920 may be a dynamic random access memory (DRAM) device, a static random access memory (SRAM) device, flash memory device, phase-change memory device, or some other memory device having suitable performance to serve as process memory. In at least one embodiment memory device 920 may operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 may connect to processor(s) 902. In at least one embodiment display device 911 may include one or more of an internal display device, as in a mobile electronic device or a laptop device or an external display device attached via a display interface (e.g., DisplayPort, etc.). In at least one embodiment, display device 911 may include a head mounted display (HMD) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 may connect via a storage interface (e.g., SATA) or via a peripheral bus, such as a Peripheral Component Interconnect bus (e.g., PCI, PCI Express). In at least one embodiment, touch sensors 925 may include touch screen sensors, pressure sensors, or fingerprint sensors. In at least one embodiment, wireless transceiver 926 may be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and may be, for example, a unified extensible firmware interface (UEFI). In at least one embodiment, network controller 934 may enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system. In at least one embodiment, platform controller hub 930 may also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 911. In at least one embodiment, platform controller hub 930 and/or memory controller 916 may be external to one or more processor(s) 902. For example, in at least one embodiment, system 900 may include an external memory controller 916 and platform controller hub 930, which may be configured as a memory controller hub and peripheral controller hub within a system chipset that is in communication with processor(s) 902.

Inference and/or training logic 515 are used to perform inferencing and/or training operations associated with one or more embodiments. Details regarding inference and/or training logic 515 are provided below in conjunction with FIGS. 5A and/or 5B. In at least one embodiment portions or all of inference and/or training logic 515 may be incorporated into graphics processor 908. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 10:
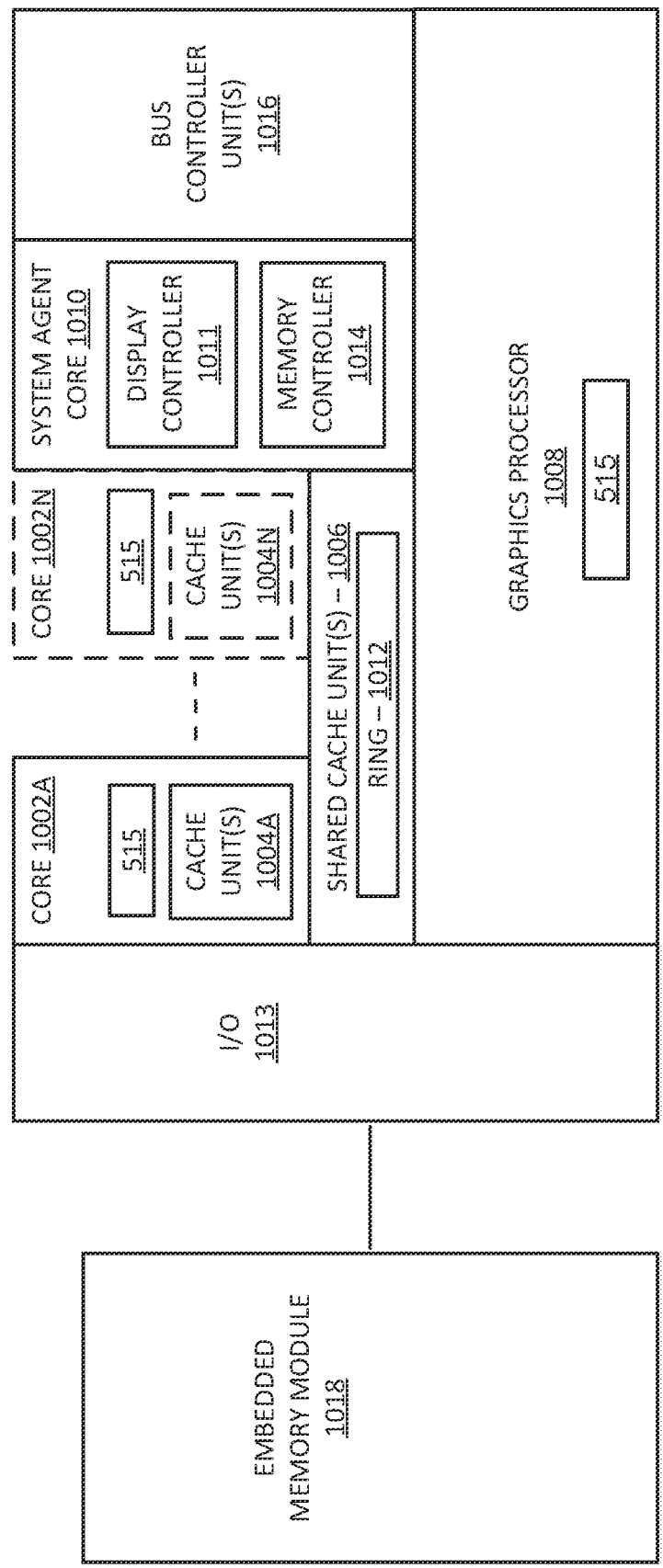
FIG. 10 illustrates at least portions of a graphic processor, in accordance with at least some embodiments.

FIG. 10 is a block diagram of a processor 1000 having one or more processor cores 1002A-1002N, an integrated memory controller 1013, and an integrated graphics processor 1008, according to at least one embodiment. In at least one embodiment, processor 1000 may include additional cores up to and including additional core 1002N represented by dashed lined boxes. In at least one embodiment, each of processor cores 1002A-1002N includes one or more internal cache units 1004A-1004N. In at least one embodiment, each processor core also has access to one or more shared cached units 1006.

In at least one embodiment, internal cache units 1004A-1004N and shared cache units 1006 represent a cache memory hierarchy within processor 1000. In at least one embodiment, cache memory units 1004A-1004N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1006 and 1004A-1004N.

In at least one embodiment, processor 1000 may also include a set of one or more bus controller units 1016 and a system agent core 1010. In at least one embodiment, one or more bus controller units 1016 manage a set of peripheral buses, such as one or more PCI or PCI express busses. In at least one embodiment, system agent core 1010 provides management functionality for various processor components. In at least one embodiment, system agent core 1010 includes one or more integrated memory controllers 1013 to manage access to various external memory devices (not shown).

In at least one embodiment, one or more of processor cores 1002A-1002N include support for simultaneous multi-threading. In at least one embodiment, system agent core 1010 includes components for coordinating and operating cores 1002A-1002N during multi-threaded processing. In at least one embodiment, system agent core 1010 may additionally include a power control unit (PCU), which includes logic and components to regulate one or more power states of processor cores 1002A-1002N and graphics processor 1008.

In at least one embodiment, processor 1000 additionally includes graphics processor 1008 to execute graphics processing operations. In at least one embodiment, graphics processor 1008 couples with shared cache units 1006, and system agent core 1010, including one or more integrated memory controllers 1013. In at least one embodiment, system agent core 1010 also includes a display controller 1011 to drive graphics processor output to one or more coupled displays. In at least one embodiment, display controller 1011 may also be a separate module coupled with graphics processor 1008 via at least one interconnect, or may be integrated within graphics processor 1008.

In at least one embodiment, a ring based interconnect unit 1012 is used to couple internal components of processor 1000. In at least one embodiment, an alternative interconnect unit may be used, such as a point-to-point interconnect, a switched interconnect, or other techniques. In at least one embodiment, graphics processor 1008 couples with ring interconnect 1012 via an I/O link 1013.

In at least one embodiment, I/O link 1013 represents at least one of multiple varieties of I/O interconnects, including an on package I/O interconnect which facilitates communication between various processor components and a high-performance embedded memory module 1018, such as an eDRAM module. In at least one embodiment, each of processor cores 1002A-1002N and graphics processor 1008 use embedded memory modules 1018 as a shared Last Level Cache.

In at least one embodiment, processor cores 1002A-1002N are homogenous cores executing a common instruction set architecture. In at least one embodiment, processor cores 1002A-1002N are heterogeneous in terms of instruction set architecture (ISA), where one or more of processor cores 1002A-1002N execute a common instruction set, while one or more other cores of processor cores 1002A-1002N executes a subset of a common instruction set or a different instruction set. In at least one embodiment, processor cores 1002A-1002N are heterogeneous in terms of microarchitecture, where one or more cores having a relatively higher power consumption couple with one or more power cores having a lower power consumption. In at least one embodiment, processor 1000 may be implemented on one or more chips or as an SoC integrated circuit.

Inference and/or training logic 515 are used to perform inferencing and/or training operations associated with one or more embodiments. Details regarding inference and/or training logic 515 are provided below in conjunction with FIGS. 5A and/or 5B. In at least one embodiment portions or all of inference and/or training logic 515 may be incorporated into processor 1000. For example, in at least one embodiment, training and/or inferencing techniques described herein may use one or more of ALUs embodied in graphics processor 1008, graphics core(s) 1002A-1002N, or other components in FIG. 10. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of graphics processor 1000 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
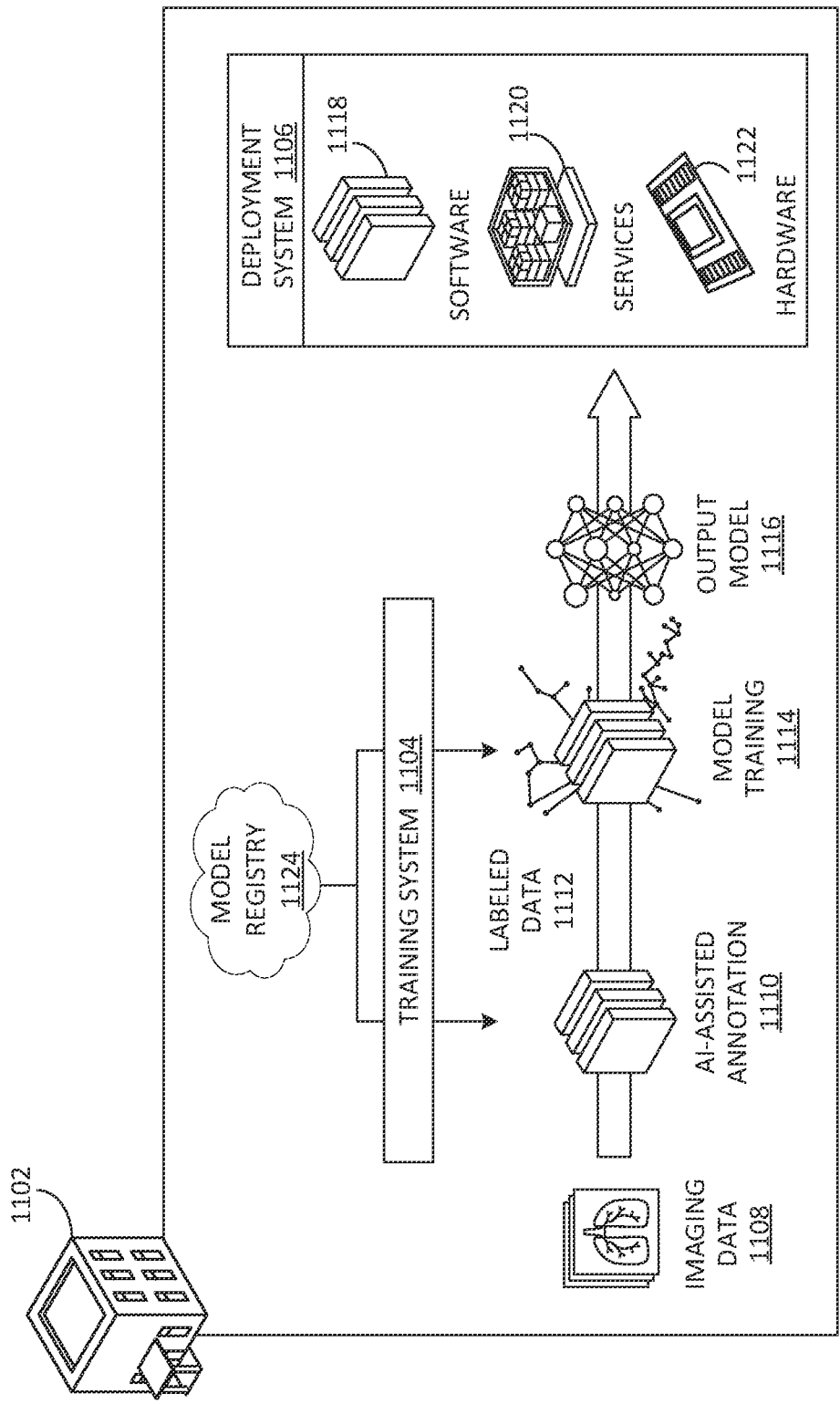
FIG. 11 illustrates an example data flow diagram for an advanced computing pipeline, in accordance with at least some embodiments.

FIG. 11 is an example data flow diagram for a process 1100 of generating and deploying an image processing and inferencing pipeline, in accordance with at least one embodiment. In at least one embodiment, process 1100 may be deployed for use with imaging devices, processing devices, and/or other device types at one or more facilities 1102. Process 1100 may be executed within a training system 1104 and/or a deployment system 1106. In at least one embodiment, training system 1104 may be used to perform training, deployment, and implementation of machine learning models (e.g., neural networks, object detection algorithms, computer vision algorithms, etc.) for use in deployment system 1106. In at least one embodiment, deployment system 1106 may be configured to offload processing and compute resources among a distributed computing environment to reduce infrastructure requirements at facility 1102. In at least one embodiment, one or more applications in a pipeline may use or call upon services (e.g., inference, visualization, compute, AI, etc.) of deployment system 1106 during execution of applications.

In at least one embodiment, some of applications used in advanced processing and inferencing pipelines may use machine learning models or other AI to perform one or more processing steps. In at least one embodiment, machine learning models may be trained at facility 1102 using data 1108 (such as imaging data) generated at facility 1102 (and stored on one or more picture archiving and communication system (PACS) servers at facility 1102), may be trained using imaging or sequencing data 1108 from another facility (ies), or a combination thereof. In at least one embodiment, training system 1104 may be used to provide applications, services, and/or other resources for generating working, deployable machine learning models for deployment system 1106.

In at least one embodiment, model registry 1124 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1124 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1204 (FIG. 12) may include a scenario where facility 1102 is training their own machine learning model, or has an existing machine learning model that needs to be optimized or updated. In at least one embodiment, imaging data 1108 generated by imaging device(s), sequencing devices, and/or other device types may be received. In at least one embodiment, once imaging data 1108 is received, AI-assisted annotation 1110 may be used to aid in generating annotations corresponding to imaging data 1108 to be used as ground truth data for a machine learning model. In at least one embodiment, AI-assisted annotation 1110 may include one or more machine learning models (e.g., convolutional neural networks (CNNs)) that may be trained to generate annotations corresponding to certain types of imaging data 1108 (e.g., from certain devices). In at least one embodiment, AI-assisted annotations 1110 may then be used directly, or may be adjusted or fine-tuned using an annotation tool to generate ground truth data. In at least one embodiment, AI-assisted annotations 1110, labeled clinic data 1112, or a combination thereof may be used as ground truth data for training a machine learning model. In at least one embodiment, a trained machine learning model may be referred to as output model 1116, and may be used by deployment system 1106, as described herein.

In at least one embodiment, training pipeline 1204 (FIG. 12) may include a scenario where facility 1102 needs a machine learning model for use in performing one or more processing tasks for one or more applications in deployment system 1106, but facility 1102 may not currently have such a machine learning model (or may not have a model that is optimized, efficient, or effective for such purposes). In at least one embodiment, an existing machine learning model may be selected from a model registry 1124. In at least one embodiment, model registry 1124 may include machine learning models trained to perform a variety of different inference tasks on imaging data. In at least one embodiment, machine learning models in model registry 1124 may have been trained on imaging data from different facilities than facility 1102 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1124. In at least one embodiment, a machine learning model may then be retrained, or updated, at any number of other facilities, and a retrained or updated model may be made available in model registry 1124. In at least one embodiment, a machine learning model may then be selected from model registry 1124—and referred to as output model 1116—and may be used in deployment system 1106 to perform one or more processing tasks for one or more applications of a deployment system.

In at least one embodiment, training pipeline 1204 (FIG. 12), a scenario may include facility 1102 requiring a machine learning model for use in performing one or more processing tasks for one or more applications in deployment system 1106, but facility 1102 may not currently have such a machine learning model (or may not have a model that is optimized, efficient, or effective for such purposes). In at least one embodiment, a machine learning model selected from model registry 1124 may not be fine-tuned or optimized for imaging data 1108 generated at facility 1102 because of differences in populations, robustness of training data used to train a machine learning model, diversity in anomalies of training data, and/or other issues with training data. In at least one embodiment, AI-assisted annotation 1110 may be used to aid in generating annotations corresponding to imaging data 1108 to be used as ground truth data for retraining or updating a machine learning model. In at least one embodiment, labeled data 1112 may be used as ground truth data for training a machine learning model. In at least one embodiment, retraining or updating a machine learning model may be referred to as model training 1114. In at least one embodiment, model training 1114—e.g., AI-assisted annotations 1110, labeled clinic data 1112, or a combination thereof—may be used as ground truth data for retraining or updating a machine learning model. In at least one embodiment, a trained machine learning model may be referred to as output model 1116, and may be used by deployment system 1106, as described herein.

In at least one embodiment, deployment system 1106 may include software 1118, services 1120, hardware 1122, and/or other components, features, and functionality. In at least one embodiment, deployment system 1106 may include a software "stack," such that software 1118 may be built on top of services 1120 and may use services 1120 to perform some or all of processing tasks, and services 1120 and software 1118 may be built on top of hardware 1122 and use hardware 1122 to execute processing, storage, and/or other compute tasks of deployment system 1106. In at least one embodiment, software 1118 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1108, in addition to containers that receive and configure imaging data for use by each container and/or for use by facility 1102 after processing through a pipeline (e.g., to convert outputs back to a usable data type). In at least one embodiment, a combination of containers within software 1118 (e.g., that make up a pipeline) may be referred to as a virtual instrument (as described in more detail herein), and a virtual instrument may leverage services 1120 and hardware 1122 to execute some or all processing tasks of applications instantiated in containers.

In at least one embodiment, a data processing pipeline may receive input data (e.g., imaging data 1108) in a specific format in response to an inference request (e.g., a request from a user of deployment system 1106). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1116 of training system 1104.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1124 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1120 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1200 (e.g., for accuracy), an application may be available in a container registry for selection and/or implementation by a user to perform one or more processing tasks with respect to data at a facility (e.g., a second facility) of a user.

Figure 12:
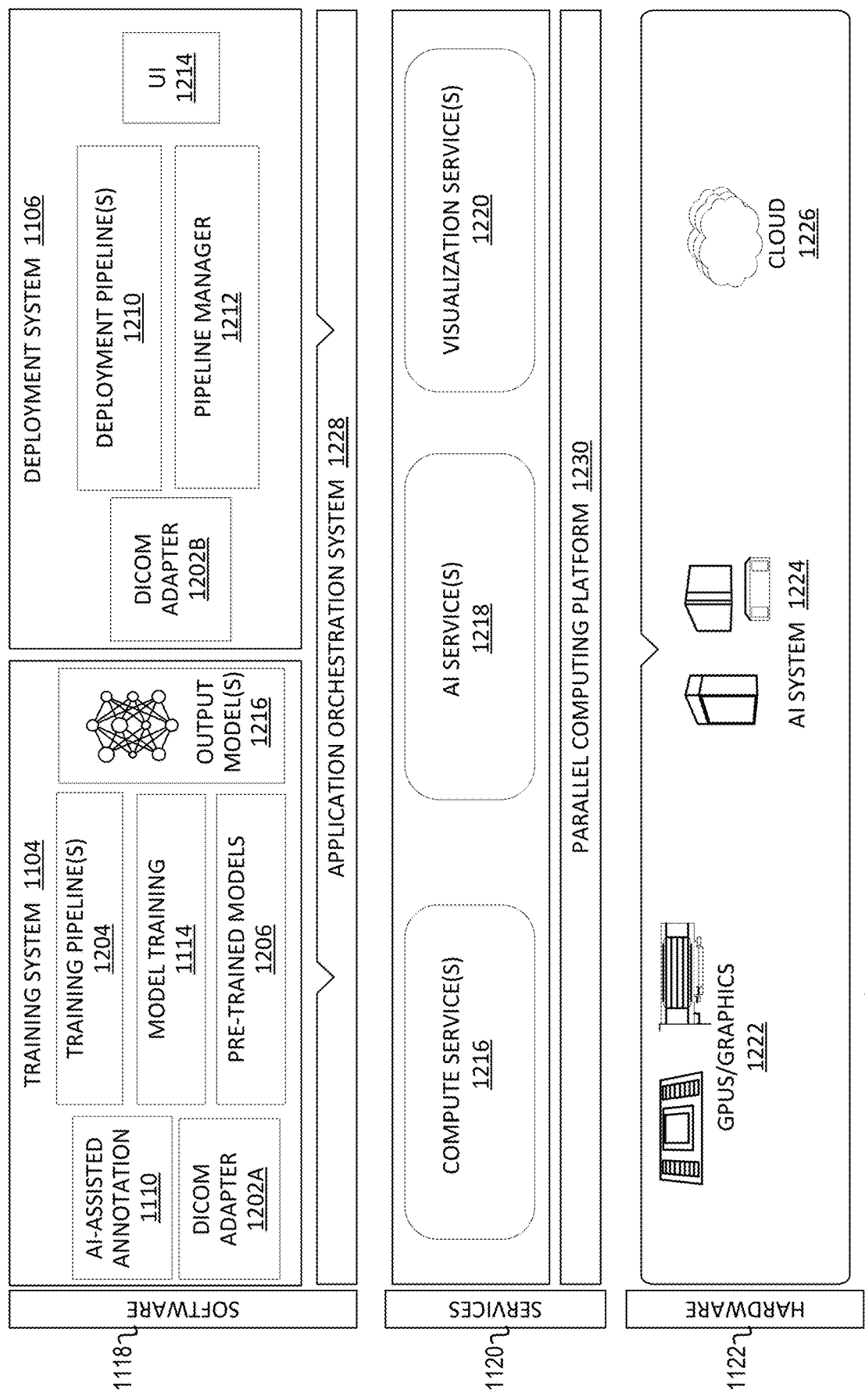
FIG. 12 illustrates a system diagram for an example system for training, adapting, instantiating and deploying machine learning models in an advanced computing pipeline, in accordance with at least some embodiment.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1124. In at least one embodiment, a requesting entity—who provides an inference or image processing request—may browse a container registry and/or model registry 1124 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1106 (e.g., a cloud) to perform processing of data processing pipeline. In at least one embodiment, processing by deployment system 1106 may include referencing selected elements (e.g., applications, containers, models, etc.) from a container registry and/or model registry 1124. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1120 may be leveraged. In at least one embodiment, services 1120 may include compute services, artificial intelligence (AI) services, visualization services, and/or other service types. In at least one embodiment, services 1120 may provide functionality that is common to one or more applications in software 1118, so functionality may be abstracted to a service that may be called upon or leveraged by applications. In at least one embodiment, functionality provided by services 1120 may run dynamically and more efficiently, while also scaling well by allowing applications to process data in parallel (e.g., using a parallel computing platform 1230 (FIG. 12)). In at least one embodiment, rather than each application that shares a same functionality offered by a service 1120 being required to have a respective instance of service 1120, service 1120 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1120 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1118 implementing advanced processing and inferencing pipeline that includes segmentation application and anomaly detection application may be streamlined because each application may call upon a same inference service to perform one or more inferencing tasks.

In at least one embodiment, hardware 1122 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1122 may be used to provide efficient, purpose-built support for software 1118 and services 1120 in deployment system 1106. In at least one embodiment, use of GPU processing may be implemented for processing locally (e.g., at facility 1102), within an AI/deep learning system, in a cloud system, and/or in other processing components of deployment system 1106 to improve efficiency, accuracy, and efficacy of image processing and generation. In at least one embodiment, software 1118 and/or services 1120 may be optimized for GPU processing with respect to deep learning, machine learning, and/or high-performance computing, as non-limiting examples. In at least one embodiment, at least some of computing environment of deployment system 1106 and/or training system 1104 may be executed in a datacenter one or more supercomputers or high performance computing systems, with GPU optimized software (e.g., hardware and software combination of NVIDIA's DGX System). In at least one embodiment, hardware 1122 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 12 is a system diagram for an example system 1200 for generating and deploying an imaging deployment pipeline, in accordance with at least one embodiment. In at least one embodiment, system 1200 may be used to implement process 1100 of FIG. 11 and/or other processes including advanced processing and inferencing pipelines. In at least one embodiment, system 1200 may include training system 1104 and deployment system 1106. In at least one embodiment, training system 1104 and deployment system 1106 may be implemented using software 1118, services 1120, and/or hardware 1122, as described herein.

In at least one embodiment, system 1200 (e.g., training system 1104 and/or deployment system 1106) may be implemented in a cloud computing environment (e.g., using cloud 1226). In at least one embodiment, system 1200 may be implemented locally with respect to a healthcare services facility, or as a combination of both cloud and local computing resources. In at least one embodiment, access to APIs in cloud 1226 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1200, may be restricted to a set of public IPs that have been vetted or authorized for interaction.

In at least one embodiment, various components of system 1200 may communicate between and among one another using any of a variety of different network types, including but not limited to local area networks (LANs) and/or wide area networks (WANs) via wired and/or wireless communication protocols. In at least one embodiment, communication between facilities and components of system 1200 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1104 may execute training pipelines 1204, similar to those described herein with respect to FIG. 11. In at least one embodiment, where one or more machine learning models are to be used in deployment pipelines 1210 by deployment system 1106, training pipelines 1204 may be used to train or retrain one or more (e.g. pre-trained) models, and/or implement one or more of pre-trained models 1206 (e.g., without a need for retraining or updating). In at least one embodiment, as a result of training pipelines 1204, output model(s) 1116 may be generated. In at least one embodiment, training pipelines 1204 may include any number of processing steps, such as but not limited to imaging data (or other input data) conversion or adaption In at least one embodiment, for different machine learning models used by deployment system 1106, different training pipelines 1204 may be used. In at least one embodiment, training pipeline 1204 similar to a first example described with respect to FIG. 11 may be used for a first machine learning model, training pipeline 1204 similar to a second example described with respect to FIG. 11 may be used for a second machine learning model, and training pipeline 1204 similar to a third example described with respect to FIG. 11 may be used for a third machine learning model. In at least one embodiment, any combination of tasks within training system 1104 may be used depending on what is required for each respective machine learning model. In at least one embodiment, one or more of machine learning models may already be trained and ready for deployment so machine learning models may not undergo any processing by training system 1104, and may be implemented by deployment system 1106.

In at least one embodiment, output model(s) 1116 and/or pre-trained model(s) 1206 may include any types of machine learning models depending on implementation or embodiment. In at least one embodiment, and without limitation, machine learning models used by system 1200 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1204 may include AI-assisted annotation, as described in more detail herein with respect to at least FIG. 11B. In at least one embodiment, labeled data 1112 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1108 (or other data type used by machine learning models), there may be corresponding ground truth data generated by training system 1104. In at least one embodiment, AI-assisted annotation may be performed as part of deployment pipelines 1210; either in addition to, or in lieu of AI-assisted annotation included in training pipelines 1204. In at least one embodiment, system 1200 may include a multi-layer platform that may include a software layer (e.g., software 1118) of diagnostic applications (or other application types) that may perform one or more medical imaging and diagnostic functions. In at least one embodiment, system 1200 may be communicatively coupled to (e.g., via encrypted links) PACS server networks of one or more facilities. In at least one embodiment, system 1200 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1102). In at least one embodiment, applications may then call or execute one or more services 1120 for performing compute, AI, or visualization tasks associated with respective applications, and software 1118 and/or services 1120 may leverage hardware 1122 to perform processing tasks in an effective and efficient manner.

In at least one embodiment, deployment system 1106 may execute deployment pipelines 1210. In at least one embodiment, deployment pipelines 1210 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1210 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1210 depending on information desired from data generated by a device. In at least one embodiment, where detections of anomalies are desired from an MRI machine, there may be a first deployment pipeline 1210, and where image enhancement is desired from output of an MRI machine, there may be a second deployment pipeline 1210.

In at least one embodiment, an image generation application may include a processing task that includes use of a machine learning model. In at least one embodiment, a user may desire to use their own machine learning model, or to select a machine learning model from model registry 1124. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1200—such as services 1120 and hardware 1122—deployment pipelines 1210 may be even more user friendly, provide for easier integration, and produce more accurate, efficient, and timely results.

In at least one embodiment, deployment system 1106 may include a user interface 1214 (e.g., a graphical user interface, a web interface, etc.) that may be used to select applications for inclusion in deployment pipeline(s) 1210, arrange applications, modify, or change applications or parameters or constructs thereof, use and interact with deployment pipeline(s) 1210 during set-up and/or deployment, and/or to otherwise interact with deployment system 1106. In at least one embodiment, although not illustrated with respect to training system 1104, user interface 1214 (or a different user interface) may be used for selecting models for use in deployment system 1106, for selecting models for training, or retraining, in training system 1104, and/or for otherwise interacting with training system 1104.

In at least one embodiment, pipeline manager 1212 may be used, in addition to an application orchestration system 1228, to manage interaction between applications or containers of deployment pipeline(s) 1210 and services 1120 and/or hardware 1122. In at least one embodiment, pipeline manager 1212 may be configured to facilitate interactions from application to application, from application to service 1120, and/or from application or service to hardware 1122. In at least one embodiment, although illustrated as included in software 1118, this is not intended to be limiting, and in some examples (e.g., as illustrated in FIG. 10) pipeline manager 1212 may be included in services 1120. In at least one embodiment, application orchestration system 1228 (e.g., Kubernetes, DOCKER, etc.) may include a container orchestration system that may group applications into containers as logical units for coordination, management, scaling, and deployment. In at least one embodiment, by associating applications from deployment pipeline(s) 1210 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1212 and application orchestration system 1228. In at least one embodiment, so long as an expected input and/or output of each container or application is known by a system (e.g., based on constructs of applications or containers), application orchestration system 1228 and/or pipeline manager 1212 may facilitate communication among and between, and sharing of resources among and between, each of applications or containers. In at least one embodiment, because one or more of applications or containers in deployment pipeline(s) 1210 may share same services and resources, application orchestration system 1228 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1228) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1120 leveraged by and shared by applications or containers in deployment system 1106 may include compute services 1216, AI services 1218, visualization services 1220, and/or other service types. In at least one embodiment, applications may call (e.g., execute) one or more of services 1120 to perform processing operations for an application. In at least one embodiment, compute services 1216 may be leveraged by applications to perform super-computing or other high-performance computing (HPC) tasks. In at least one embodiment, compute service(s) 1216 may be leveraged to perform parallel processing (e.g., using a parallel computing platform 1230) for processing data through one or more of applications and/or one or more tasks of a single application, substantially simultaneously. In at least one embodiment, parallel computing platform 1230 (e.g., NVIDIA's CUDA) may enable general purpose computing on GPUs (GPGPU) (e.g., GPUs 1222). In at least one embodiment, a software layer of parallel computing platform 1230 may provide access to virtual instruction sets and parallel computational elements of GPUs, for execution of compute kernels. In at least one embodiment, parallel computing platform 1230 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1230 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1218 may be leveraged to perform inferencing services for executing machine learning model(s) associated with applications (e.g., tasked with performing one or more processing tasks of an application). In at least one embodiment, AI services 1218 may leverage AI system 1224 to execute machine learning model(s) (e.g., neural networks, such as CNNs) for segmentation, reconstruction, object detection, feature detection, classification, and/or other inferencing tasks. In at least one embodiment, applications of deployment pipeline (s) 1210 may use one or more of output models 1116 from training system 1104 and/or other models of applications to perform inference on imaging data. In at least one embodiment, two or more examples of inferencing using application orchestration system 1228 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1228 may distribute resources (e.g., services 1120 and/or hardware 1122) based on priority paths for different inferencing tasks of AI services 1218.

In at least one embodiment, shared storage may be mounted to AI services 1218 within system 1200. In at least one embodiment, shared storage may operate as a cache (or other storage device type) and may be used to process inference requests from applications. In at least one embodiment, when an inference request is submitted, a request may be received by a set of API instances of deployment system 1106, and one or more instances may be selected (e.g., for best fit, for load balancing, etc.) to process a request. In at least one embodiment, to process a request, a request may be entered into a database, a machine learning model may be located from model registry 1124 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1212) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1120 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1226, and an inference service may perform inferencing on a GPU.

In at least one embodiment, visualization services 1220 may be leveraged to generate visualizations for viewing outputs of applications and/or deployment pipeline(s) 1210. In at least one embodiment, GPUs 1222 may be leveraged by visualization services 1220 to generate visualizations. In at least one embodiment, rendering effects, such as raytracing, may be implemented by visualization services 1220 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1220 may include an internal visualizer, cinematics, and/or other rendering or image processing capabilities or functionality (e.g., ray tracing, rasterization, internal optics, etc.).

In at least one embodiment, hardware 1122 may include GPUs 1222, AI system 1224, cloud 1226, and/or any other hardware used for executing training system 1104 and/or deployment system 1606. In at least one embodiment, GPUs 1222 (e.g., NVIDIA's TESLA and/or QUADRO GPUs) may include any number of GPUs that may be used for executing processing tasks of compute services 1216, AI services 1218, visualization services 1220, other services, and/or any of features or functionality of software 1118. For example, with respect to AI services 1218, GPUs 1222 may be used to perform pre-processing on imaging data (or other data types used by machine learning models), post-processing on outputs of machine learning models, and/or to perform inferencing (e.g., to execute machine learning models). In at least one embodiment, cloud 1226, AI system 1224, and/or other components of system 1200 may use GPUs 1222. In at least one embodiment, cloud 1226 may include a GPU-optimized platform for deep learning tasks. In at least one embodiment, AI system 1224 may use GPUs, and cloud 1226—or at least a portion tasked with deep learning or inferencing—may be executed using one or more AI systems 1224. As such, although hardware 1122 is illustrated as discrete components, this is not intended to be limiting, and any components of hardware 1122 may be combined with, or leveraged by, any other components of hardware 1122.

In at least one embodiment, AI system 1224 may include a purpose-built computing system (e.g., a super-computer or an HPC) configured for inferencing, deep learning, machine learning, and/or other artificial intelligence tasks. In at least one embodiment, AI system 1224 (e.g., NVIDIA's DGX) may include GPU-optimized software (e.g., a software stack) that may be executed using a plurality of GPUs 1222, in addition to DPUs, CPUs, RAM, storage, and/or other components, features, or functionality. In at least one embodiment, one or more AI systems 1224 may be implemented in cloud 1226 (e.g., in a data center) for performing some or all of AI-based processing tasks of system 1200.

In at least one embodiment, cloud 1226 may include a GPU-accelerated infrastructure (e.g., NVIDIA's NGC) that may provide a GPU-optimized platform for executing processing tasks of system 1200. In at least one embodiment, cloud 1226 may include an AI system(s) 1224 for performing one or more of AI-based tasks of system 1200 (e.g., as a hardware abstraction and scaling platform). In at least one embodiment, cloud 1226 may integrate with application orchestration system 1228 leveraging multiple GPUs to enable seamless scaling and load balancing between and among applications and services 1120. In at least one embodiment, cloud 1226 may tasked with executing at least some of services 1120 of system 1200, including compute services 1216, AI services 1218, and/or visualization services 1220, as described herein. In at least one embodiment, cloud 1226 may perform small and large batch inference (e.g., executing NVIDIA's TENSOR RT), provide an accelerated parallel computing API and platform 1230 (e.g., NVIDIA's CUDA), execute application orchestration system 1228 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1200.

Figure 13A:
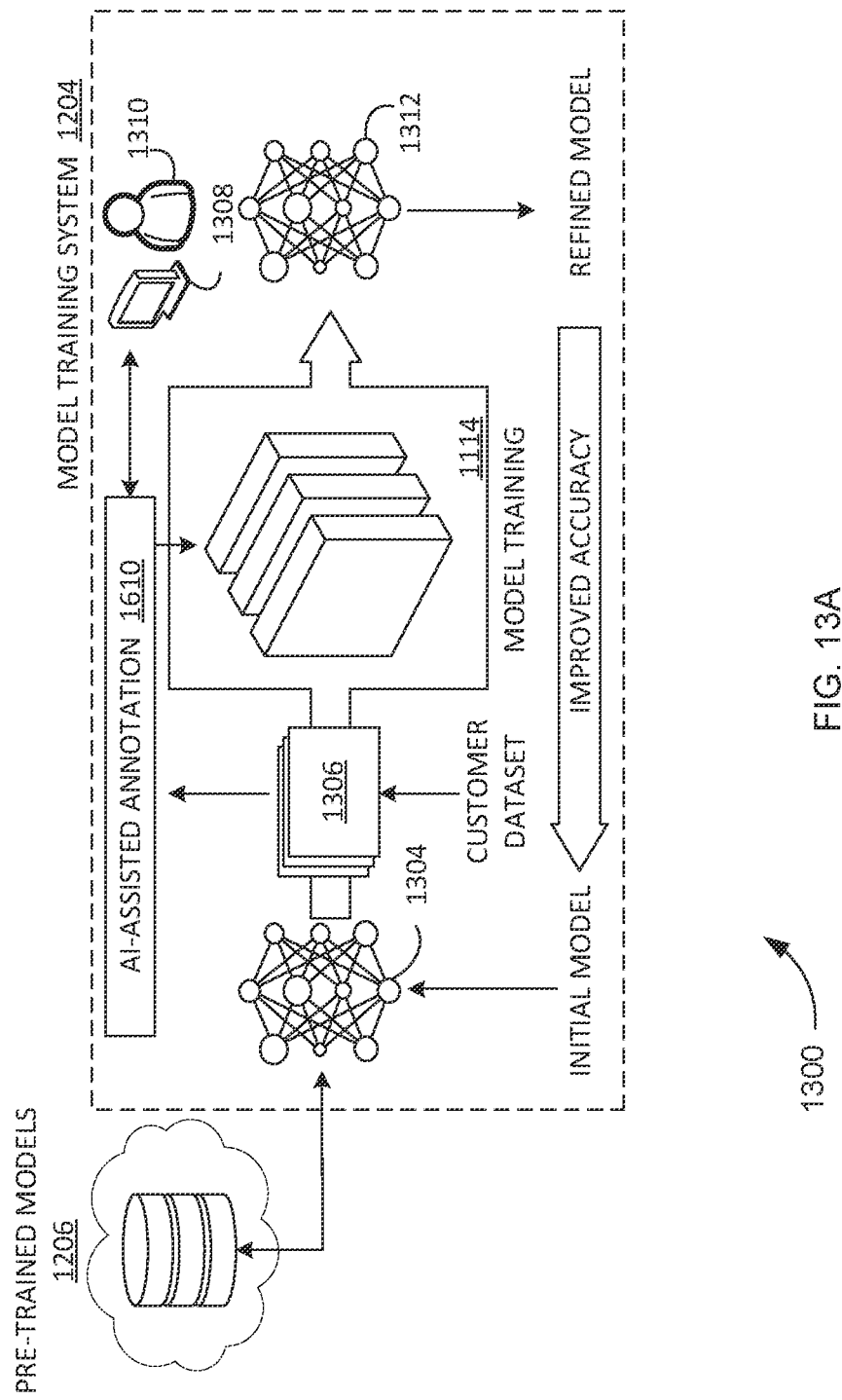
FIGS. 13A and 13B illustrate a data flow diagram for a process to train a machine learning model, as well as client-server architecture to enhance annotation tools with pre-trained annotation models, in accordance with at least some embodiments.

FIG. 13A illustrates a data flow diagram for a process 1300 to train, retrain, or update a machine learning model, in accordance with at least one embodiment. In at least one embodiment, process 1300 may be executed using, as a non-limiting example, system 1200 of FIG. 12. In at least one embodiment, process 1300 may leverage services 1120 and/or hardware 1122 of system 1200, as described herein. In at least one embodiment, refined models 1312 generated by process 1300 may be executed by deployment system 1106 for one or more containerized applications in deployment pipelines 1210.

In at least one embodiment, model training 1114 may include retraining or updating an initial model 1304 (e.g., a pre-trained model) using new training data (e.g., new input data, such as customer dataset 1306, and/or new ground truth data associated with input data). In at least one embodiment, to retrain, or update, initial model 1304, output or loss layer(s) of initial model 1304 may be reset, or deleted, and/or replaced with an updated or new output or loss layer(s). In at least one embodiment, initial model 1304 may have previously fine-tuned parameters (e.g., weights and/or biases) that remain from prior training, so training or retraining 1114 may not take as long or require as much processing as training a model from scratch. In at least one embodiment, during model training 1114, by having reset or replaced output or loss layer(s) of initial model 1304, parameters may be updated and re-tuned for a new data set based on loss calculations associated with accuracy of output or loss layer(s) at generating predictions on new, customer dataset 1306 (e.g., image data 1108 of FIG. 11).

In at least one embodiment, pre-trained models 1206 may be stored in a data store, or registry (e.g., model registry 1124 of FIG. 11). In at least one embodiment, pre-trained models 1206 may have been trained, at least in part, at one or more facilities other than a facility executing process 1300. In at least one embodiment, to protect privacy and rights of patients, subjects, or clients of different facilities, pre-trained models 1206 may have been trained, on-premise, using customer or patient data generated on-premise. In at least one embodiment, pre-trained models 1206 may be trained using cloud 1226 and/or other hardware 1122, but confidential, privacy protected patient data may not be transferred to, used by, or accessible to any components of cloud 1226 (or other off premise hardware). In at least one embodiment, where a pre-trained model 1206 is trained at using patient data from more than one facility, pre-trained model 1206 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1206 on-premise and/or off premise, such as in a datacenter or other cloud computing infrastructure.

In at least one embodiment, when selecting applications for use in deployment pipelines 1210, a user may also select machine learning models to be used for specific applications. In at least one embodiment, a user may not have a model for use, so a user may select a pre-trained model 1206 to use with an application. In at least one embodiment, pre-trained model 1206 may not be optimized for generating accurate results on customer dataset 1306 of a facility of a user (e.g., based on patient diversity, demographics, types of medical imaging devices used, etc.). In at least one embodiment, prior to deploying pre-trained model 1206 into deployment pipeline 1210 for use with an application(s), pre-trained model 1206 may be updated, retrained, and/or fine-tuned for use at a respective facility.

In at least one embodiment, a user may select pre-trained model 1206 that is to be updated, retrained, and/or fine-tuned, and pre-trained model 1206 may be referred to as initial model 1304 for training system 1104 within process 1300. In at least one embodiment, customer dataset 1306 (e.g., imaging data, genomics data, sequencing data, or other data types generated by devices at a facility) may be used to perform model training 1114 (which may include, without limitation, transfer learning) on initial model 1304 to generate refined model 1312. In at least one embodiment, ground truth data corresponding to customer dataset 1306 may be generated by training system 1104. In at least one embodiment, ground truth data may be generated, at least in part, by clinicians, scientists, doctors, practitioners, at a facility (e.g., as labeled clinic data 1112 of FIG. 11).

In at least one embodiment, AI-assisted annotation 1110 may be used in some examples to generate ground truth data. In at least one embodiment, AI-assisted annotation 1110 (e.g., implemented using an AI-assisted annotation SDK) may leverage machine learning models (e.g., neural networks) to generate suggested or predicted ground truth data for a customer dataset. In at least one embodiment, user 1310 may use annotation tools within a user interface (a graphical user interface (GUI)) on computing device 1308.

In at least one embodiment, user 1310 may interact with a GUI via computing device 1308 to edit or fine-tune (auto)annotations. In at least one embodiment, a polygon editing feature may be used to move vertices of a polygon to more accurate or fine-tuned locations.

In at least one embodiment, once customer dataset 1306 has associated ground truth data, ground truth data (e.g., from AI-assisted annotation, manual labeling, etc.) may be used by during model training 1114 to generate refined model 1312. In at least one embodiment, customer dataset 1306 may be applied to initial model 1304 any number of times, and ground truth data may be used to update parameters of initial model 1304 until an acceptable level of accuracy is attained for refined model 1312. In at least one embodiment, once refined model 1312 is generated, refined model 1312 may be deployed within one or more deployment pipelines 1210 at a facility for performing one or more processing tasks with respect to medical imaging data.

In at least one embodiment, refined model 1312 may be uploaded to pre-trained models 1206 in model registry 1124 to be selected by another facility. In at least one embodiment, his process may be completed at any number of facilities such that refined model 1312 may be further refined on new datasets any number of times to generate a more universal model.

Figure 13B:
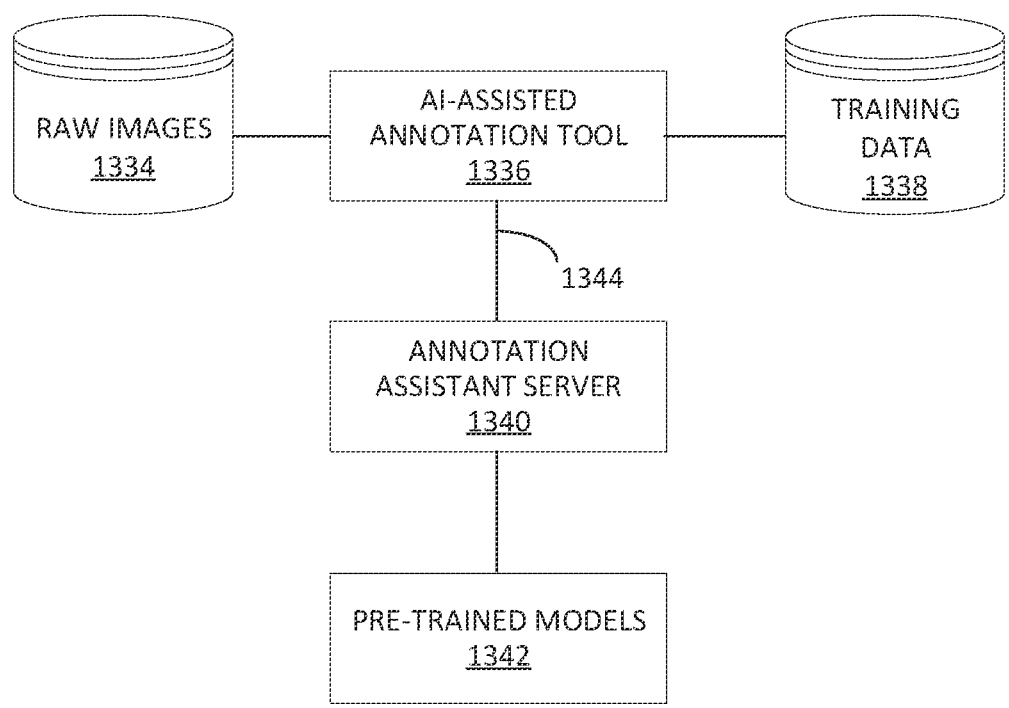

FIG. 13B is an example illustration of a client-server architecture 1332 to enhance annotation tools with pre-trained annotation models, in accordance with at least one embodiment. In at least one embodiment, AI-assisted annotation tools 1336 may be instantiated based on a client-server architecture 1332. In at least one embodiment, annotation tools 1336 in imaging applications may aid radiologists, for example, identify organs and abnormalities. In at least one embodiment, imaging applications may include software tools that help user 1310 to identify, as a non-limiting example, a few extreme points on a particular organ of interest in raw images 1334 (e.g., in a 3D MRI or CT scan) and receive auto-annotated results for all 2D slices of a particular organ. In at least one embodiment, results may be stored in a data store as training data 1338 and used as (for example and without limitation) ground truth data for training. In at least one embodiment, when computing device 1308 sends extreme points for AI-assisted annotation 1110, a deep learning model, for example, may receive this data as input and return inference results of a segmented organ or abnormality. In at least one embodiment, pre-instantiated annotation tools, such as AI-Assisted Annotation Tool 1336B in FIG. 13B, may be enhanced by making API calls (e.g., API Call 1344) to a server, such as an Annotation Assistant Server 1340 that may include a set of pre-trained models 1342 stored in an annotation model registry, for example. In at least one embodiment, an annotation model registry may store pre-trained models 1342 (e.g., machine learning models, such as deep learning models) that are pre-trained to perform AI-assisted annotation on a particular organ or abnormality. These models may be further updated by using training pipelines 1204. In at least one embodiment, pre-installed annotation tools may be improved over time as new labeled clinic data 1112 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
receiving, using a processing device, a first optimization condition associated with an operation at a data center, wherein the operation at the data center pertains to a first location at the data center, the first location corresponding to a first environmental parameter value;
providing the first optimization condition and the first environmental parameter value as an input to a reinforcement learning agent comprising a machine learning model;
obtaining an output of the reinforcement learning agent, the output comprising an indication of a final location at the data center, wherein the final location is associated with the operation, and wherein the final location corresponds to a final environmental parameter value that is closer to a target associated with the first optimization condition than the first environmental parameter value corresponding to the first location at the data center; and
providing a reward to the reinforcement learning agent, the reward corresponding to a comparison of the first environmental parameter value and the final environmental parameter value.

2. The method of claim 1, further comprising:
re-training the machine learning model of the reinforcement learning agent based on the reward;
obtaining a second output of the reinforcement learning agent, the second output comprising an indication of a second location of the operation at the data center, wherein the second location corresponds to a second environmental parameter value; and
providing a second reward to the reinforcement learning agent, the second reward corresponding to a comparison of the first environmental parameter value and the second environmental parameter value.

3. The method of claim 2, wherein re-training the machine learning model of the reinforcement learning agent based on the reward comprises:
determining a Q-value for the reinforcement learning agent based on the reward; and
re-training the machine learning model using the Q-value, wherein the machine learning model approximates a Q-value function of the reinforcement learning agent.

4. The method of claim 1, further comprising:
executing the operation at the final location in response to the reinforcement learning agent outputting the final location.

5. The method of claim 4, further comprising:
receiving, using the processing device, a second environmental parameter value associated with executing the operation at the final location;
determining that the second environmental parameter value is different than the final environmental parameter value in response to receiving the second environmental parameter value; and
updating the reward to correspond to a comparison of the first environmental parameter value and the second environmental parameter value.

6. The method of claim 1, wherein the machine learning model is one of a plurality of machine learning models of the reinforcement learning agent, wherein each model of the plurality of machine learning models is trained in association with a respective optimization condition, and wherein the first optimization condition causes the reinforcement learning agent to select the machine learning model from the plurality of machine learning models to generate the output of the reinforcement learning agent.

7. The method of claim 1, further comprising:
providing one or more additional optimization conditions of a plurality of optimization conditions to the reinforcement learning agent, wherein the reinforcement learning agent is trained to output the final location based on receiving the first optimization condition and the one or more additional optimization conditions of the plurality of optimization conditions.

8. The method of claim 1, wherein the first optimization condition represents at least one of:
a cooling condition associated with the operation, total data center energy consumption condition, water cooling condition, heat dissipation condition, air flow condition, condition associated with temperature, condition associated with weather forecasts, condition associated with location of adjacent operations, condition associated with location of all operations currently executing at the data center, thermal equilibrium conditions, electricity consumption condition, condition associated with electricity costs, a condition associated with a time associated with the operation, condition associated with a type of operation, or a condition associated with an amount of energy associated with executing the operation.

9. The method of claim 1, further comprising:
generating training data comprising an amount of energy associated with executing the operation and at least one of a cooling parameter associated with the operation, total data center energy consumption parameter, water cooling parameter, heat dissipation parameter, air flow parameter, parameter associated with temperature, parameter associated with weather forecasts, parameter associated with location of adjacent operations, parameter associated with location of all operations currently executing at the data center, thermal equilibrium parameter, electricity consumption parameter, parameter associated with electricity costs, a parameter associated with a time associated with the operation, data transfer associated with the operation, or type of operation; and
training the machine learning model of the reinforcement learning agent using the training data.

10. A system comprising:
a processing device to:
receive a first optimization condition associated with an operation at a data center, wherein the operation at the data center pertains to a first location at the data center, the first location corresponding to a first environmental parameter value;

provide the first optimization condition and the first environmental parameter value as an input to a reinforcement learning agent comprising a machine learning model;

obtaining an output of the reinforcement learning agent, the output comprising an indication of a final location at the data center, wherein the final location is associated with the operation, and wherein the final location corresponds to a final environmental parameter value that is closer to a target associated with the first optimization condition than the first environmental parameter value corresponding to the first location at the data center; and providing a reward to the reinforcement learning agent, the reward corresponding to a comparison of the first environmental parameter value and the final environmental parameter value.

11. The system of claim 10, wherein the processing device is further to:

re-train the machine learning model of the reinforcement learning agent based on the reward;

obtain a second output of the reinforcement learning agent, the second output comprising an indication of a second location of the operation at the data center, wherein the second location corresponds to a second environmental parameter value; and providing a second reward to the reinforcement learning agent, the second reward corresponding to a comparison of the first environmental parameter value and the second environmental parameter value.

12. They system of claim 11, wherein to re-train the machine learning model of the reinforcement learning agent based on the reward, the processing device is further to:

determine a Q-value for the reinforcement learning agent based on the reward; and re-train the machine learning model using the Q-value, wherein the machine learning model approximates a Q-value function of the reinforcement learning agent.

13. The system of claim 10, wherein the processing device is further to:

execute the operation at the final location in response to the reinforcement learning agent outputting the final location.

14. The system of claim 13, wherein the processing device is further to:

receive a second environmental parameter value associated with executing the operation at the final location;

determine the second environmental parameter value is different than the final environmental parameter value in response to receiving the second environmental parameter value; and update the reward to correspond to a comparison of the first environmental parameter value and the second environmental parameter value.

15. The system of claim 10, wherein the machine learning model is one of a plurality of machine learning models of the reinforcement learning agent, wherein each model of the plurality of machine learning models is trained in association with a respective optimization condition, and wherein the first optimization condition causes the reinforcement learning agent to select the machine learning model from the plurality of machine learning models to generate the output of the reinforcement learning agent.

16. The system of claim 10, wherein the processing device is to:

provide one or more additional optimization conditions of a plurality of optimization conditions to the reinforcement learning agent, wherein the reinforcement learning agent is trained to output the final location based on receiving the first optimization condition and the one or more additional optimization conditions of the plurality of optimization conditions.

17. The system of claim 10, wherein the first optimization condition represents at least one of:

a cooling condition associated with the operation, total data center energy consumption condition, water cooling condition, heat dissipation condition, air flow condition, condition associated with temperature, condition associated with weather forecasts, condition associated with location of adjacent operations, condition associated with location of all operations currently executing at the data center, thermal equilibrium conditions, electricity consumption condition, condition associated with electricity costs, or a condition associated with a time associated with the operation, condition associated with a type of operation, or a condition associated with an amount of energy associated with executing the operation.

18. The system of claim 10, wherein the processing device is further to:

generate training data comprising an amount of energy associated with executing the operation and at least one of a cooling parameter associated with the operation, total data center energy consumption parameter, water cooling parameter, heat dissipation parameter, air flow parameter, parameter associated with temperature, parameter associated with weather forecasts, parameter associated with location of adjacent operations, parameter associated with location of all operations currently executing at the data center, thermal equilibrium parameter, electricity consumption parameter, parameter associated with electricity costs, or a parameter associated with a time associated with the operation, data transfer associated with the operation, or type of operation; and train the machine learning model of the reinforcement learning agent using the training data.

19. A non-transitory computer-readable medium storing instructions thereon, wherein the instructions, when executed by a processing device, cause the processing device to:

receive a first optimization condition associated with an operation at a data center, wherein the operation at the data center pertains to a first location at the data center, the first location corresponding to a first environmental parameter value;

provide the first optimization condition and the first environmental parameter value as an input to a reinforcement learning agent comprising a machine learning model;

obtain an output of the reinforcement learning agent, the output comprising an indication of a final location at the data center, wherein the final location is associated with the operation, and wherein the final location corresponds to a final environmental parameter value that is closer to a target associated with the first optimization condition than the first environmental parameter value corresponding to the first location at the data center; and provide a reward to the reinforcement learning agent, the reward corresponding to a comparison of the first environmental parameter value and the final environmental parameter value.

20. The non-transitory computer-readable medium of claim 19, wherein the first optimization condition represents at least one of:

a cooling condition associated with the operation, total data center energy consumption condition, water cooling condition, heat dissipation condition, air flow condition, condition associated with temperature, condition associated with weather forecasts, condition associated with location of adjacent operations, condition associated with location of all operations currently executing at the data center, thermal equilibrium conditions, electricity consumption condition, condition associated with electricity costs, or a condition associated with a time associated with the operation, condition associated with a type of operation, or a condition associated with an amount of energy associated with executing the operation.

* * * * *